US010783786B2

(12) United States Patent
Franklin et al.

(10) Patent No.: US 10,783,786 B2
(45) Date of Patent: Sep. 22, 2020

(54) SYSTEM AND METHOD FOR DETERMINING PARKING INFRACTION

(71) Applicant: Tannery Creek Systems Inc., Vaughan (CA)

(72) Inventors: William George Franklin, Aurora (CA); Jeffrey D. Bethune, Toronto (CA); Raphael Leung, Thornhill (CA); Michael Braden Walker, Toronto (CA)

(73) Assignee: Tannery Creek Systems Inc., Vaughan (CA)

( * ) Notice: Subject to any disclaimer, the term of this patent is extended or adjusted under 35 U.S.C. 154(b) by 0 days.

(21) Appl. No.: 16/356,374

(22) Filed: Mar. 18, 2019

(65) Prior Publication Data
US 2019/0259278 A1    Aug. 22, 2019

Related U.S. Application Data

(63) Continuation of application No. 15/384,410, filed on Dec. 20, 2016, now abandoned.
(Continued)

(51) Int. Cl.
*B60Q 1/48* (2006.01)
*G08G 1/14* (2006.01)
(Continued)

(52) U.S. Cl.
CPC ............ *G08G 1/149* (2013.01); *G06Q 40/00* (2013.01); *G07B 15/02* (2013.01); *G07F 17/24* (2013.01);
(Continued)

(58) Field of Classification Search
CPC .... G08G 1/149; G08G 1/0129; G08G 1/0175; G08G 1/04; G06Q 40/00; G07B 15/02; G07F 17/24
(Continued)

(56) References Cited

U.S. PATENT DOCUMENTS 4,337,482 A    6/1982  Coutta
4,514,068 A    4/1985  Urquhart
(Continued)

FOREIGN PATENT DOCUMENTS

WO          93/19441 A1     9/1993

OTHER PUBLICATIONS

The Golden Ears Bridge Greater Vancouver Transportation Authority, Contract 0214-45 The Golden Ears Bridge Tolling Technology / Operations Technical Advisor, Toll Technology Assessment Final Report, Jan. 20, 2005, pp. 1-63.
(Continued)

*Primary Examiner* — Zhen Y Wu
(74) *Attorney, Agent, or Firm* — Bereskin & Parr LLP/S.E.N.C.R.L., s.r.l.

(57) ABSTRACT

Various embodiments are described herein for methods and systems for managing a parking area. In one embodiment, the method comprises receiving a parking authorization request from a parking lot user, the request specifying a parking stall identifier corresponding to a parking stall occupied by the users vehicle, the request further specifying a parking duration parameter identifying a time duration the user's vehicle can occupy the stall; determining a parking duration rule for the stall based on the parking duration parameter, the rule indicating a parking expiration time; at a first time, receiving a first data associated with the parking stall identifier, the first data comprising an occupancy parameter indicating a presence or absence of a parked vehicle at the identified stall; if the occupancy parameter indicates a presence of a parked vehicle, generate a citation alert for the stall if the first time exceeds the parking expiration time.

20 Claims, 14 Drawing Sheets

Related U.S. Application Data

(60) Provisional application No. 62/272,359, filed on Dec. 29, 2015.

(51) Int. Cl.
| | |
|---|---|
| *G07B 15/02* | (2011.01) |
| *G06Q 40/00* | (2012.01) |
| *G08G 1/01* | (2006.01) |
| *G08G 1/017* | (2006.01) |
| *G08G 1/04* | (2006.01) |
| *G07F 17/24* | (2006.01) |

(52) U.S. Cl.
CPC ......... *G08G 1/0129* (2013.01); *G08G 1/0175* (2013.01); *G08G 1/04* (2013.01)

(58) Field of Classification Search
USPC ...................................................... 340/932.2
See application file for complete search history.

(56) References Cited

U.S. PATENT DOCUMENTS

| | | | |
|---|---|---|---|
| 4,737,847 A | 4/1988 | Araki et al. | |
| 4,817,166 A | 3/1989 | Gonzalez et al. | |
| 5,091,780 A | 2/1992 | Pomerleau | |
| 5,255,347 A | 10/1993 | Matsuba et al. | |
| 5,263,097 A | 11/1993 | Katz et al. | |
| 5,263,118 A | 11/1993 | Cornelison | |
| 5,343,237 A | 8/1994 | Morimoto | |
| 5,497,430 A | 3/1996 | Sadovnik et al. | |
| 5,740,050 A | 4/1998 | Ward, II | |
| 5,745,052 A | 4/1998 | Matsuyama et al. | |
| 5,845,268 A | 12/1998 | Moore | |
| 5,905,247 A | 5/1999 | Ilen | |
| 6,026,367 A | 2/2000 | Hjelmvik | |
| 6,047,234 A | 4/2000 | Cherveny et al. | |
| 6,081,206 A * | 6/2000 | Kielland | G06Q 30/0284 |
| | | | 194/902 |
| 6,102,285 A | 8/2000 | Elias | |
| 6,229,445 B1 | 5/2001 | Wack | |
| 6,233,523 B1 | 5/2001 | Sood | |
| 6,526,352 B1 | 2/2003 | Breed et al. | |
| 6,559,776 B2 | 5/2003 | Katz | |
| RE38,626 E | 10/2004 | Kielland | |
| 6,832,206 B1 | 12/2004 | Chelnik | |
| 6,885,311 B2 | 4/2005 | Howard et al. | |
| 6,885,312 B1 | 4/2005 | Kirkpatrick | |
| 6,898,495 B2 | 5/2005 | Tanaka et al. | |
| 6,917,307 B2 | 7/2005 | Li | |
| 6,927,700 B1 | 8/2005 | Quinn | |
| 6,943,726 B2 | 9/2005 | Schneider | |
| 6,946,973 B1 | 9/2005 | Yanda | |
| 6,948,729 B2 | 9/2005 | Zalila et al. | |
| 7,355,527 B2 | 4/2008 | Franklin et al. | |
| 9,773,413 B1 * | 9/2017 | Li | G05D 1/0248 |
| 10,475,343 B2 * | 11/2019 | Ghannam | H04L 67/12 |
| 2001/0020961 A1 | 9/2001 | Pauschinger | |
| 2001/0035830 A1 | 11/2001 | Rosenberg et al. | |
| 2002/0008639 A1 | 1/2002 | Dee | |
| 2002/0024451 A1 * | 2/2002 | Rosenberg | G07B 15/02 |
| | | | 340/932.2 |
| 2002/0109610 A1 * | 8/2002 | Katz | G07B 15/02 |
| | | | 340/932.2 |
| 2002/0145664 A1 * | 10/2002 | Jones | G08G 1/0175 |
| | | | 348/128 |
| 2003/0159036 A1 | 8/2003 | Walmsley et al. | |
| 2003/0208352 A1 | 11/2003 | Lee | |
| 2004/0068433 A1 | 4/2004 | Chatterjee | |
| 2004/0254900 A1 | 12/2004 | Reinhard | |
| 2005/0002544 A1 * | 1/2005 | Winter | G08G 1/14 |
| | | | 382/104 |
| 2005/0068196 A1 * | 3/2005 | Marin | G07B 15/02 |
| | | | 340/932.2 |
| 2005/0104723 A1 | 5/2005 | Mandy | |
| 2005/0149384 A1 | 7/2005 | Odinak | |
| 2005/0168352 A1 | 8/2005 | Tomer | |
| 2005/0190076 A1 | 9/2005 | Howard et al. | |
| 2005/0228715 A1 | 10/2005 | Hartig et al. | |
| 2005/0237225 A1 | 10/2005 | Jesadanont et al. | |
| 2005/0286421 A1 | 12/2005 | Janacek | |
| 2007/0016539 A1 * | 1/2007 | Groft | G06Q 30/0284 |
| | | | 705/418 |
| 2007/0029825 A1 * | 2/2007 | Franklin | G06Q 30/0284 |
| | | | 293/128 |
| 2008/0021770 A1 | 1/2008 | Mourton et al. | |
| 2008/0319837 A1 * | 12/2008 | Mitschele | G07F 9/002 |
| | | | 705/13 |
| 2010/0117820 A1 * | 5/2010 | Mitschele | G08G 1/147 |
| | | | 340/539.1 |
| 2010/0191584 A1 | 7/2010 | Fraser et al. | |
| 2012/0078686 A1 * | 3/2012 | Bashani | G07B 15/00 |
| | | | 705/13 |
| 2012/0218122 A1 * | 8/2012 | Bogaard | G07B 15/02 |
| | | | 340/870.03 |
| 2012/0285790 A1 * | 11/2012 | Jones | G07C 5/02 |
| | | | 194/217 |
| 2014/0156183 A1 * | 6/2014 | Windeler | G08G 1/144 |
| | | | 701/454 |
| 2014/0365283 A1 * | 12/2014 | Stenneth | G07B 15/02 |
| | | | 705/13 |
| 2015/0134454 A1 | 5/2015 | Sandbrook | |
| 2015/0138001 A1 * | 5/2015 | Davies | G08G 1/149 |
| | | | 340/932.2 |
| 2015/0149263 A1 * | 5/2015 | Stenneth | G06Q 20/14 |
| | | | 705/13 |
| 2016/0078759 A1 * | 3/2016 | Nerayoff | G08G 1/052 |
| | | | 701/3 |
| 2017/0186317 A1 | 6/2017 | Franklin et al. | |
| 2017/0249625 A1 * | 8/2017 | Vossoughi | G06Q 20/3223 |
| 2017/0366945 A1 * | 12/2017 | Uliyar | G01S 19/51 |
| 2018/0201264 A1 * | 7/2018 | Schoenly | B60W 30/165 |
| 2020/0111364 A1 * | 4/2020 | Damsaz | G06K 9/6268 |

OTHER PUBLICATIONS

Boaz Allen & Hamilton, Intelligent Transportation Systems Field Operational Test Cross-cutting Study, Commercial Vehicle Operations—Roadside, Nov. 1998, pp. 1-25. Available: https://www.fhwa.dot.gov/publications/research/operations/its/99036/fotroadside.pdf.

"Parking Enforcement Operations Manual," Berkeley Police Department Parking Enforcement Unit, Feb. 4, 2015, 147 pages. <https://www.cityofberkeley.info/uploadedFiles/Police/Level_3_-_General/PEOManual111814rev3.pdf>.

* cited by examiner

| Parking Stall No. | Stall Type | Stall Co-ordinates | Occupied? | Payment Time | Expiry Time | Stall Data |
|---|---|---|---|---|---|---|
| A1 | A | X1, Y1<br>X2, Y2<br>X3, Y3<br>X4, Y4 | No | | | 571, 572 (within 575) |
| B1 | P | X1, Y1<br>X2, Y2<br>X3, Y3<br>X4, Y4 | Yes | 08-11-2015 10:00 | 08-11-2015 13:30 | |
| C1 | R | X1, Y1<br>X2, Y2<br>X3, Y3<br>X4, Y4 | N | | | |

510 Parking Stall No.; 520 Stall Type; 530 Stall Co-ordinates; 540 Occupied?; 550 Payment Time; 560 Expiry Time; 570 Stall Data; 571, 572, 575

FIG. 5

SYSTEM AND METHOD FOR DETERMINING PARKING INFRACTION

TECHNICAL FIELD

The invention relates generally to the field of parking enforcement, and more specifically to systems and methods for the automatic detection of parking infractions.

BACKGROUND

Regulation of vehicle parking in parking lots and street allows for a more orderly flow of traffic and parking resource management at various times of the day or week. This further encourages vehicle turnover and better and fairer utilization of parking resources. Implementation of parking regulations further allows the parking authority responsible for managing the use of parking spaces to generate revenue through the collection of fees.

One of the concerns associated with management of fee-for-use parking lots is unauthorized use of such parking lots. Typically, a parking enforcement officer manually monitors such fee-for-use parking lots to detect unauthorized use of parking spaces. However, the parking enforcement officer is usually required to patrol the parking lots on foot and issue citations to unauthorized vehicles. Such a process tends to be slow, expensive, prone to errors and interruption due to inclement weather, safety issues, fatigue or other issues related to more manual methods of enforcement.

SUMMARY

In a broad aspect, at least one embodiment described herein provides a method of managing a parking area, the parking lot comprising a plurality of parking stalls for occupancy by a plurality of vehicles, each parking stall being uniquely identifiable using a parking stall identifier. The method comprises: receiving a parking authorization request from a parking lot user, the parking authorization request specifying a parking stall identifier corresponding to a parking stall that is occupied by a vehicle belonging to the parking lot user, the parking authorization request further specifying a parking duration parameter identifying a duration of time for which the parking lot user can park the vehicle at the parking stall; determining a parking duration rule for the parking stall based on the parking duration parameter, the parking duration rule indicating a parking expiration time at which the vehicle must vacate; at a first time, receiving a first data associated with the parking stall identifier, the first data comprising an occupancy parameter indicating a presence or an absence of a parked vehicle at the parking stall identified by the parking stall identifier; if the occupancy parameter indicates a presence of a parked vehicle, determining if the first time exceeds the parking expiration time; and if the first time exceeds the parking expiration time, generating a citation alert for the parking stall identified by the parking stall identifier.

In some embodiments, the method of managing a parking area further comprises issuing a parking citation to the parked vehicle based on the citation alert.

In some embodiments, the parking authorization request further comprises a vehicle identifier identifying at least one characteristic of the vehicle, the method comprising at the first time, further receiving a detected vehicle identifier corresponding to at least one detected characteristic of the parked vehicle at the parking stall, the at least one detected characteristic being comparable to the at least one characteristic; determining if the parked vehicle is the same as the vehicle corresponding to the parking authorization request by comparing the vehicle identifier and the detected vehicle identifier; if the parked vehicle and the vehicle corresponding to the parking authorization request are determined to be different vehicles, determining if a second parking authorization request is received from the parked vehicle; and if the second parking authorization request is determined to not have been received from the parked vehicle, generating the citation alert for the parking stall.

In some embodiments, the at least one characteristic of the vehicle comprises a data item selected from the group consisting of a license plate number of the vehicle, year of make of the vehicle, model of the vehicle, color of the vehicle and transponder identity of the vehicle.

In some embodiments, the at least one detected characteristic of the parked vehicle comprises a data item selected from the group consisting of a license plate number of the vehicle, model of the vehicle, color of the vehicle, shape and length of the vehicle, and transponder identity of the vehicle.

In some embodiments, the first time does not exceed the parking expiration time, and the first data further comprises a first detected vehicle identifier identifying at least one characteristic of the parked vehicle detected at the first time, and wherein the method further comprises: at a second time, where the second time does not exceed the parking expiration time, receiving a second data associated with the parking stall identifier, wherein the second data comprises a second detected vehicle identifier identifying at least one characteristic of a parked vehicle detected at the parking stall at the second time, wherein the second time is subsequent to the first time, and wherein the at least one characteristic of the parked vehicle detected at the first time and the at least one characteristic of the parked vehicle detected at the second time correspond to a same data item; comparing the first detected vehicle identifier to the second detected vehicle identifier; if the first detected vehicle identifier and the second detected vehicle identifier are determined to correspond to different vehicles, determining if a second parking authorization request is received from the parked vehicle detected at the second time; and if the second parking authorization request is determined to not have been received, generating the citation alert for the parking stall.

In another aspect, in at least one embodiment described herein, there is provided a method of managing a parking lot using a patrol vehicle, the parking lot comprising a plurality of parking stalls for occupancy by a plurality of vehicles, each parking stall being uniquely identifiable using a parking stall identifier. The method comprises operating the patrol vehicle to patrol the parking lot; determining, at a first time, for an occupied parking stall, a parking stall identifier; determining, at the first time, a parking duration rule for the parking stall identifier based on a parking authorization request comprising a parking duration parameter received from an operator of a vehicle occupying the occupied parking stall, wherein the parking duration parameter identifies a duration of time for which the vehicle can be parked at the parking stall, and wherein the parking duration rule indicates a parking expiration time at which the vehicle must vacate the parking stall; and determining if the first time exceeds the parking expiration time, and if so, generating a citation alert for the parking stall identified by the parking stall identifier.

In some embodiments, the method of managing a parking lot using a patrol vehicle further comprises issuing a parking citation to a parked vehicle based on the citation alert.

In some embodiments, the first time does not exceed the parking expiration time, the method of managing a parking lot using a patrol vehicle further comprises determining, at the first time, a detected vehicle identifier corresponding to at least one detected characteristic of a parked vehicle at the parking stall; determining if the parked vehicle corresponds to the vehicle associated with the parking authorization request, wherein the parking authorization request further comprises a vehicle identifier identifying at least one characteristic of the vehicle; if the parked vehicle does not correspond to the vehicle associated with the parking authorization request, determining if a second parking authorization request is received for the parking stall identifier; and if the second parking authorization request is determined to not have been received for the parking stall identifier, generating the citation alert and issuing the parking citation to the parked vehicle.

In some embodiments, the parking lot is patrolled based on a prescheduled time.

In some embodiments, determining the parking stall identifier comprises capturing one or more images of the occupied parking stall using an image detector mounted on the patrol vehicle; and processing the one or more images to identify the parking stall identifier.

In some embodiments, processing the one or more images comprises converting the one or more images into a machine-encoded text.

In some embodiments, the parking stall identifier is designed to minimize blooming.

In some embodiments, determining the parking stall identifier comprises scanning the occupied parking stall using a radio-frequency identification reader mounted on the patrol vehicle, wherein the parking stall identifier comprises a radio-frequency identification tag detectable by the radio-frequency identification reader.

In some embodiments, determining the parking stall identifier comprises identifying the GPS coordinates corresponding to the occupied parking stall being patrolled and determining an associated parking stall identifier by querying a parking management database.

In some embodiments, identifying an occupied parking stall in the parking lot comprises scanning each parking stall within the parking lot to capture one or more images of the parking stall; and processing the one or more images to detect absence or presence of a vehicle in the parking stall.

In some embodiments, determining the detected vehicle identifier comprises detecting a license plate number of the parked vehicle using an image detector.

In another aspect, in at least one embodiment described herein, there is provided a parking lot management system for a parking lot comprising a plurality of parking stalls for occupancy by a plurality of vehicles, each parking stall being uniquely identifiable using a parking stall identifier, the system comprising a communication network; a non-transient computer memory; and at least processor coupled to the non-transient computer memory and the communication network. The at least one processor being configured to i) receive a parking authorization request from a parking lot user, the parking authorization request specifying a parking stall identifier corresponding to a parking stall that is occupied by a vehicle belonging to the parking lot user, the parking authorization request further specifying a parking duration parameter identifying a duration of time for which the parking lot user can park the vehicle at the parking stall; ii) determine a parking duration rule for the parking stall based on the parking duration parameter, the parking duration rule indicating a parking expiration time at which the vehicle must vacate; iii) at a first time, receive a first data associated with the parking stall identifier, the first data comprising an occupancy parameter indicating a presence or an absence of a parked vehicle at the parking stall identified by the parking stall identifier; iv) if the occupancy parameter indicates a presence of a parked vehicle, determine if the first time exceeds the parking expiration time; and v) if the first time exceeds the parking expiration time, generate a citation alert for the parking stall identified by the parking stall identifier.

In some embodiments, the processor is further configured to perform the method described in the preceding paragraphs.

In another aspect, in at least one embodiment described herein, there is provided a computer-readable medium storing computer-executable instructions. The instructions cause a processor to perform a method of managing a parking area, the parking area comprising a plurality of parking stalls for occupancy by a plurality of vehicles, each parking stall being uniquely identifiable using a parking stall identifier. The method comprises receiving a parking authorization request from a parking lot user, the parking authorization request specifying a parking stall identifier corresponding to a parking stall that is occupied by a vehicle belonging to the parking lot user, the parking authorization request further specifying a parking duration parameter identifying a duration of time for which the parking lot user can park the vehicle at the parking stall; determining a parking duration rule for the parking stall based on the parking duration parameter, the parking duration rule indicating a parking expiration time at which the vehicle must vacate; at a first time, receiving a first data associated with the parking stall identifier, the first data comprising an occupancy parameter indicating a presence or an absence of a parked vehicle at the parking stall identified by the parking stall identifier; if the occupancy parameter indicates a presence of a parked vehicle, determining if the first time exceeds the parking expiration time; and if the first time exceeds the parking expiration time, generating a citation alert for the parking stall identified by the parking stall identifier.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

Several embodiments of the present invention will now be described in detail with reference to the drawings, in which:

FIG. 5 is a block diagram depicting the structure of a parking management database in accordance with an example embodiment;

Figure 1:
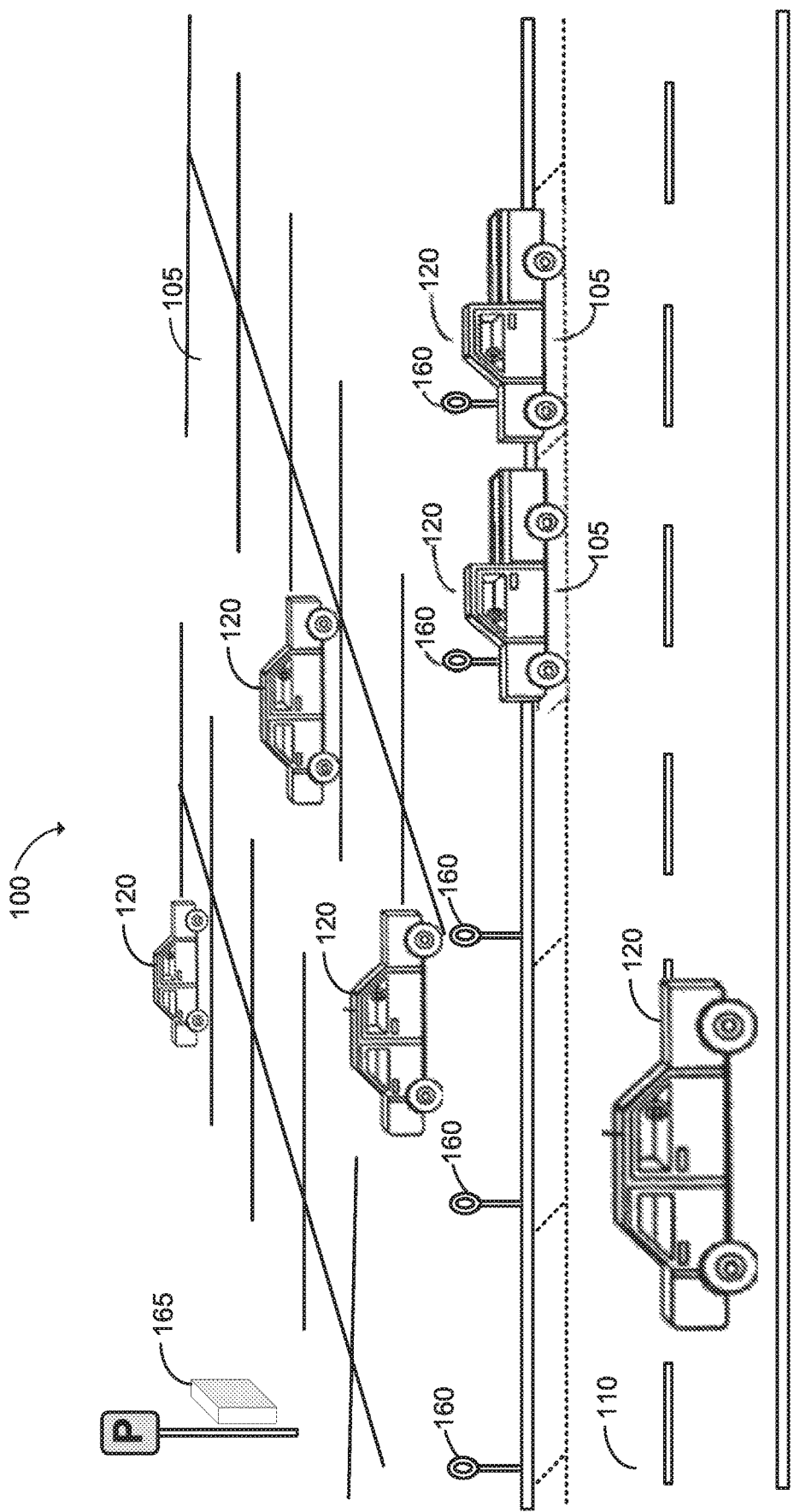
FIG. 1 is a block diagram of a parking lot in accordance with an example embodiment.

The drawings are provided for the purposes of illustrating various aspects and features of the example embodiments described herein. For simplicity and clarity of illustration, elements shown in the FIGS. have not necessarily been drawn to scale. Further, where considered appropriate, reference numerals may be repeated among the FIGS. to indicate corresponding or analogous elements.

DETAILED DESCRIPTION

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, mobile telephone, smartphone or any other computing device capable of being configured to carry out the methods described herein.

Each program may be implemented in one or a multiplicity of languages including high level procedural or object oriented programming or scripting language, assembler, macro or other programmatic methods to communicate with a computer system. The language may be a compiled or interpreted language. Each such computer program may be stored locally on a non-transitory computer readable storage medium (e.g. read-only memory, magnetic disk, optical disc) or remotely as on a remote server, such as on a third party cloud server or on the internet generally. The remotely stored programs may be accessed via a local communication system. The storage medium and/or the local or remote servers so configured cause a computer to operate in a specific and predefined manner to perform the functions described herein.

While particular combinations of various functions and features are expressly described herein, other combinations of these features and functions are possible that are not limited by the particular examples disclosed herein, and these are expressly incorporated within the scope of the present invention.

As the term module is used in the description of the various embodiments, a module includes a functional block that is implemented in hardware or software, or both, that performs one or more functions such as the processing of an input signal to produce an output signal. As used herein, a module may contain sub-modules that themselves are modules.

The various embodiments described herein generally relate to methods and systems for pay-by-space parking. Pay-by-space parking is one system of parking management which permits regulation of parking areas or parking stalls on an individualized basis. A parking area may have one or more parking stalls, where each parking stall may be identified or labeled with a unique parking stall number. For the purpose of this disclosure, a "parking area" may refer to any location having one or more spaces in which a vehicle can be parked. Parking areas therefore include parking stalls within parking structures, underground parking lots, ground level parking lots and road-side parking.

A motorist wishing to park his or her vehicle in one of the unoccupied parking stalls (a "parker") pays a fee associated with occupying that parking stall for a fixed period of time and is generally required to vacate the parking stall when that period of time has lapsed. Alternatively parking policy may permit the parker to repay (i.e. extend) their parking session. The parker's failure to vacate the parking stall on time may constitute a parking violation for which a parking citation may be issued by the parking authority responsible for managing the parking area.

In the pay-by-space parking regime, the parker generally first parks his or her car at a desired parking stall and then pays the necessary parking fee for the use of that particular parking stall. In most cases, the parker only specifies the duration of time for which the parker desires to occupy the parking stall. In some other cases, the parker additionally specifies to the parking authority the parking stall number that is being occupied. The parking authority may provide parking meters for each parking stall to collect payment. The parking authority may alternatively provide a parking kiosk for a group of parking stalls for parkers to specify the parking stall being used and provide payment. Additionally, in some cases, the parking authority may also accept parking stall information and payment using mobile phone or smartphone or by web technologies. The parking fee may be set by the parking authority, and various fee structures may be imposed. For example, the parking authority can choose to charge the parker on a fixed fee basis, such a flat-rate parking fee, or on a variable fee basis in which the fee may be based on the amount of parking time desired. In some other cases, additional parking arrangements may be established between the parker and the parking authority. For example, the parker and the parking authority may enter into a parking subscription arrangement so that the parker may be able to occupy a designated stall each time the parking lot is used. The subscription may provide an agreement between the parker and the parking authority with respect to times and dates during which the designated parking stall may be used and the method of payment (e.g. bi-weekly, monthly etc.).

Reference is first made to FIG. 1, which illustrates a block diagram of a parking lot 100 according to an example embodiment. As illustrated, parking lot 100 includes numerous parking stalls 105 of more or less the same dimensions. Each parking stall 105 may be legally occupied by a parker's vehicle 120 as long as the parker obeys the conditions associated with the particular parking stall and the parking lot overall.

In the illustrated embodiment, the parking lot 100 is a paid parking lot where a parker is required to make a payment in order to occupy a parking stall 105. Typically, the payment required is proportional to the duration of time for which the parker desires to park the vehicle. In some other cases, however, the payment required may be a fixed payment. In some cases the use of the parking lot 100 may be subject to the terms of a predefined contract or subscription, including those that specify times, durations and the identity of the vehicle or vehicles permitted to use the parking lot 100.

The parking lot 100 and accordingly, the parking stalls 105 may be located completely outdoors, completely indoors or partly outdoors and indoors. For example, in some cases, the parking lot 100 may be provided along a roadway 110 upon which vehicles 120 may be driven. The term roadway 110 may be used to refer to any transportation route upon which a vehicle 120 may be driven and parked. In another example, the parking lot 100 may be established in an enclosed area, such as an underground parking structure.

Parking meters 160 or kiosks (not shown) may be provided for the purpose of collecting parking fees. Individualized parking meters 160 located beside each parking stall 140 may be provided to allow the parker to pay for the associated stall. Alternatively, a single parking kiosk configured with the necessary input and interface functionalities may be used to collect fees for a number of parking stalls. Such a kiosk can be located in proximity to the parking stalls that it serves to allow parkers to purchase parking time. In the case of a parking kiosk configured to serve several parking stalls, the parker may be required to enter the parking stall number to indicate the stall being used.

When a parker pays for a parking stall, the payment information, stall information and the time of payment may be sent to a central processor as a parking request for processing and recorded in a parking management database ("database"). Upon receipt of a parking request, the central processor may update the status of the relevant parking stall to indicate that the respective parking stall is occupied. Other stall related information such as the parking expiration time for that stall may also be updated. In some embodiments of the present invention, the information contained in the parking request may be received and processed in real time. In other embodiments, the parking requests may be received and processed in batches at a central location (such as, for example, the parking office). The latter case may apply, for instance, where there is a delay or an interruption preventing the parking kiosk or parking meter from communicating the parking requests to the central processor. The parking kiosk or parking meter may continue to collect payments and accept parking requests while the communication delay or interruption persists, and transmit all unsent parking requests to the central processor once communication is re-established.

In some cases, post processing of batched data also permits correction of errors by parkers (when entering their stall number or license number for example) and providing grace periods before and after the parking session ends. Additionally post processing facilitates patrolling efficiency since the patrol vehicle does not have to stop to issue an infraction every time a parking violation is detected. Post processing and associated advantages are discussed in further detail below.

The parking kiosk or parking meter may issue a receipt or a parking voucher to the parker indicating the amount paid and the parking expiration time. The parker may choose to place the voucher for display on the dashboard or keep the ticket. In some embodiments, placement of the parking voucher on the dashboard may be optional since the database has a record of when a parking stall should be occupied and when it should be vacated based on the information obtained from the parking request.

Preparation of Parking Stalls

With respect to the parking stalls, each parking stall is labelled with a unique parking stall number before being used. The database may be used by the central processor to store all relevant information regarding each parking stall within the parking area. In some embodiments, the database may be integrated with the central processor. In other embodiments, the database may be independent or separated from the central processor. In this case, the database may be a network-accessible database that may be accessed over a communications network.

Figure 2A:
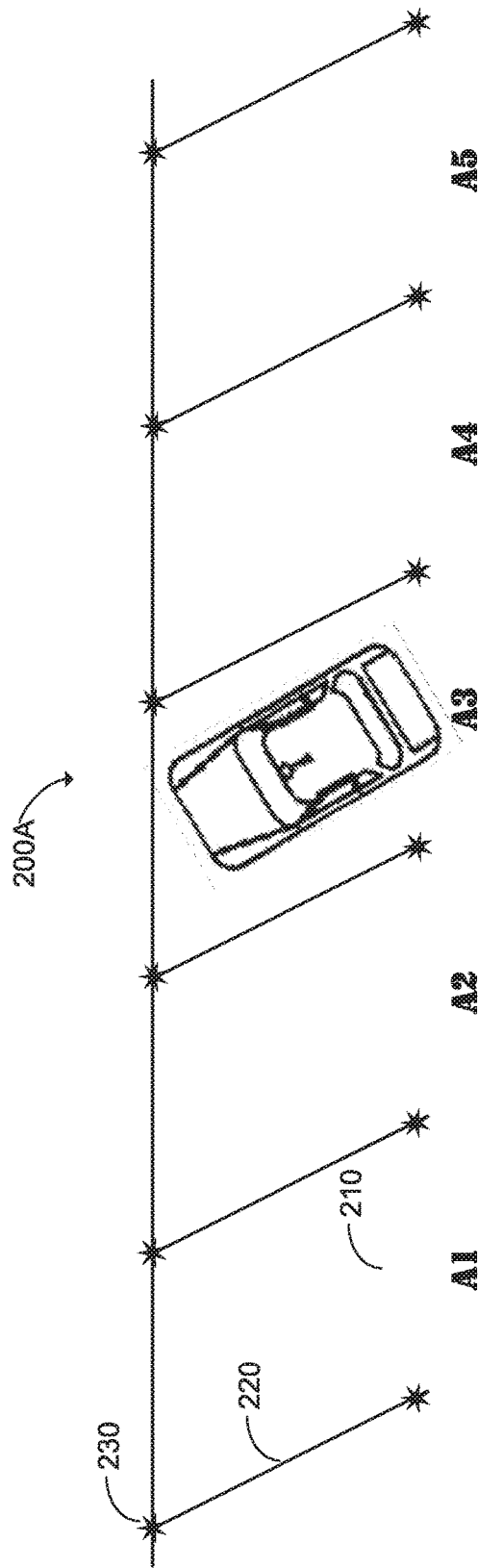
FIGS. 2A-2C is a block diagram of various parking stall configurations in accordance with an example embodiment.
Figure 2B:
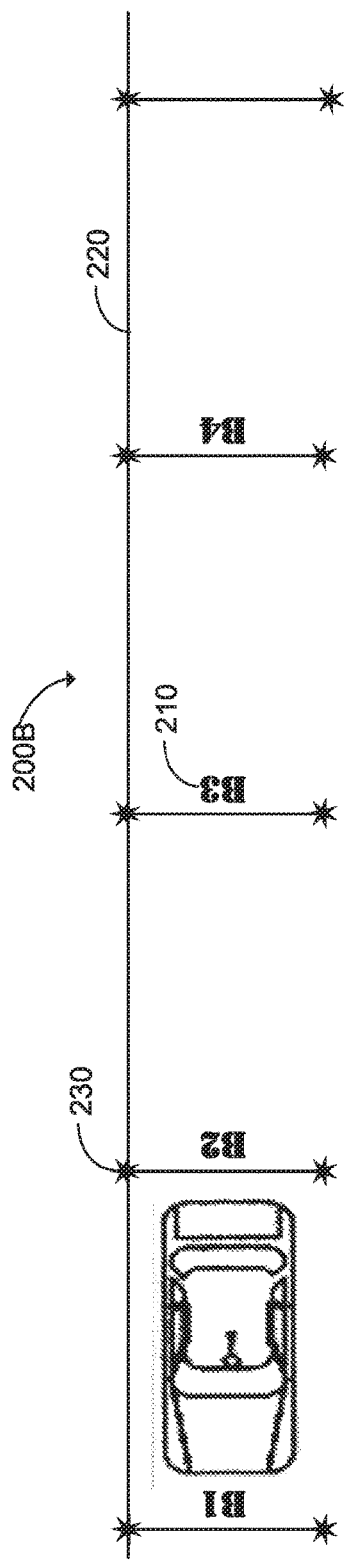
Figure 2C:
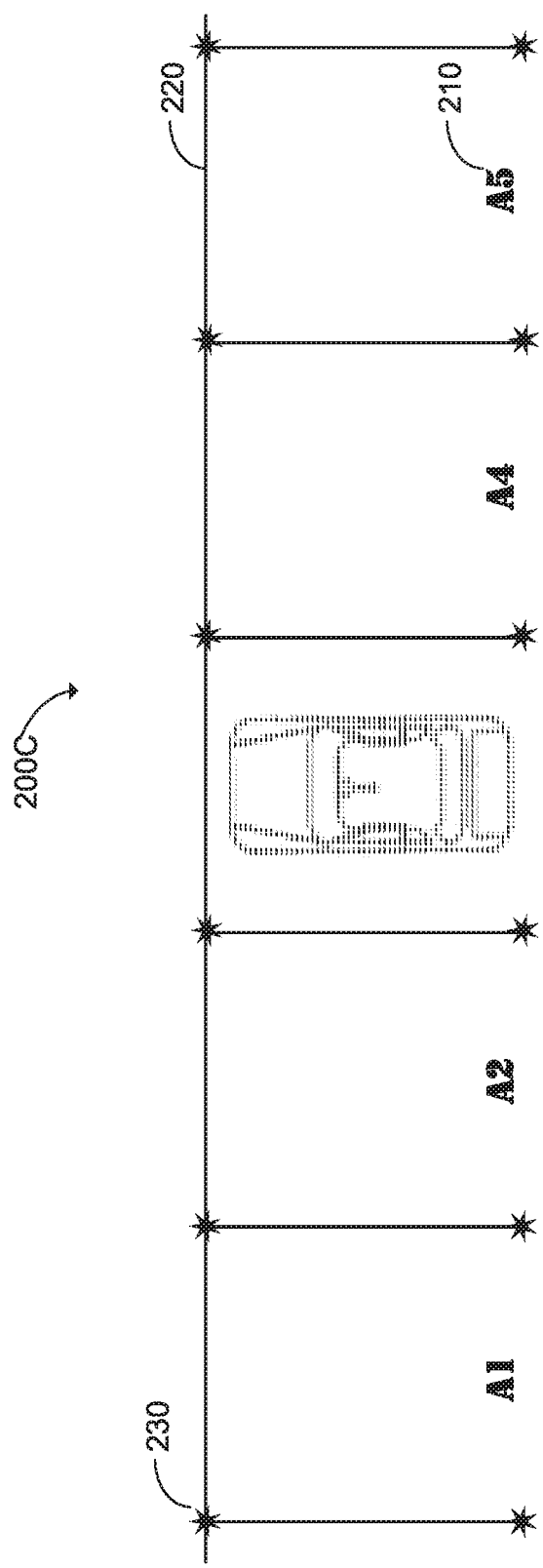

Reference is now made to FIGS. 2A-2C which illustrates different parking stall configurations, each configuration having parking stall labelled with a parking stall number 210. The term parking stall number used herein may be any unique identifier capable of identifying a parking stall. Therefore, a stall number may be a numeric or alphanumeric identifier.

Each parking stall in the various embodiments herein is demarcated from neighbouring parking stalls. This may be accomplished by using one or more demarcation lines 220 indicated on the surface of the ground. In some other cases, different colors may be used to distinguish between different parking stalls. For instance, alternate parking stalls may be colored using the same color to distinguish the parking stalls. In some other cases, physical barriers may be used to distinguish between parking stalls.

FIG. 2A illustrates angled parking stalls 200A, while FIG. 2B illustrates parallel parking stalls 200B. Lastly, FIG. 2C illustrates rectangular parking stalls 200C. As shown in FIGS. 2A-2C, the parking stall number 210 may be indicated using markings on the ground. For example, the five angled parking stalls 200A may be labeled "A1" to "A5". In other embodiments, parking stall signs may be used to facilitate identification of the parking stall number.

The locations of each parking stall can be further identified using a number of location markers such as GPS coordinate points 230 to specify the four corners of each parking stall. These location markers may assist a mobile enforcement vehicle, discussed below, to identify individual parking stalls. Alternatively, a single location marker such as a GPS coordinate point corresponding to the center of the stall (not shown) may be used instead. The latter method may be less precise in respect of determining the boundaries of a parking stall since the parking stalls may not be of standard dimensions, making demarcation of individual stalls more difficult by the mobile enforcement vehicle.

A survey of the parking area may also be performed prior to its use to obtain accurate positional information (i.e. GPS coordinates of each corner) for the parking stalls. The survey data may be stored in a machine readable format such as XML, KML or CSV. Additionally, reference images of empty stalls may additionally be obtained in association with each stall to indicate a field of view in which the parking stall is empty to facilitate identification of the correct parking stall.

Management of Pay-By-Space Parking

In the pay-by-space system, each occupied parking stall may have a different parking expiration time. In other words, each parking stall may be governed by its own set of parking enforcement rules. To ensure a parker's compliance with parking enforcement rules, parking enforcement officers ("PEO") may be relied upon. The PEO may patrol the parking area according to a desired patrol schedule and patrol route. In some embodiments, the patrol schedule may require that PEO patrol the parking area continuously, at a predetermined time interval, or as required by the parking authority. In other embodiments the patrol schedule and patrol route may be based on various historical statistics. For example, parking stalls that are associated with higher instances of parking infractions may justify more frequent patrols. In yet other embodiments, to improve efficiency, parking stalls that are empty may be ignored by the PEO, while parking stalls that are occupied may be examined or scanned. During a scan, the parking stall number or information pertaining to the vehicle occupying the stall, or both may be recorded by the PEO.

Traditionally, enforcement of pay-by-space parking by PEOs has often been performed on foot using a handheld device such as a camera-equipped smartphone or a dedicated specialized handheld device. This so-called "handheld enforcement" generally requires the PEO to patrol the parking area or parking lot on foot and scan each vehicle and the stall in which vehicle occupies one by one. Where a citation is to be issued, the PEO may issue the citation by printing the citation and placing the citation (i.e. serving the citation) on the windshield of the parked vehicle. In other circumstances, the PEO may make note of all parking stalls in which citations ought to be issued and transmit the information to the central processor at a later time for batch processing and subsequently mailed out to the parker.

It can be appreciated that enforcement by a walking PEO using a handheld device is time consuming. Therefore, it may be preferable to patrol using vehicular mobile enforcement techniques (i.e. mobile enforcement vehicle). A mobile enforcement vehicle equipped with the appropriate scanning systems may scan and collect parking stall information at a much higher speed. The mobile enforcement vehicle may also transmit vehicle and stall information in real time or in batch-mode. Vehicles for which citations are required may be determined immediately and a citation may be generated immediately (i.e. issuance of citations in real-time) or mailed in batches at a later time (i.e. issuance of citations in batch mode). Alternatively, parking stall numbers for which a citation ought to be issued may be transmitted to an on-foot PEO who may then go directly to the citable vehicle to issue and serve the citations. This is an example of "microprocessing" (discussed further below) which increases the efficiency of the mobile enforcement by reducing the number of times the mobile enforcement vehicle may be required to stop while accomplishing "real-time" issuance of citations.

Figure 3:
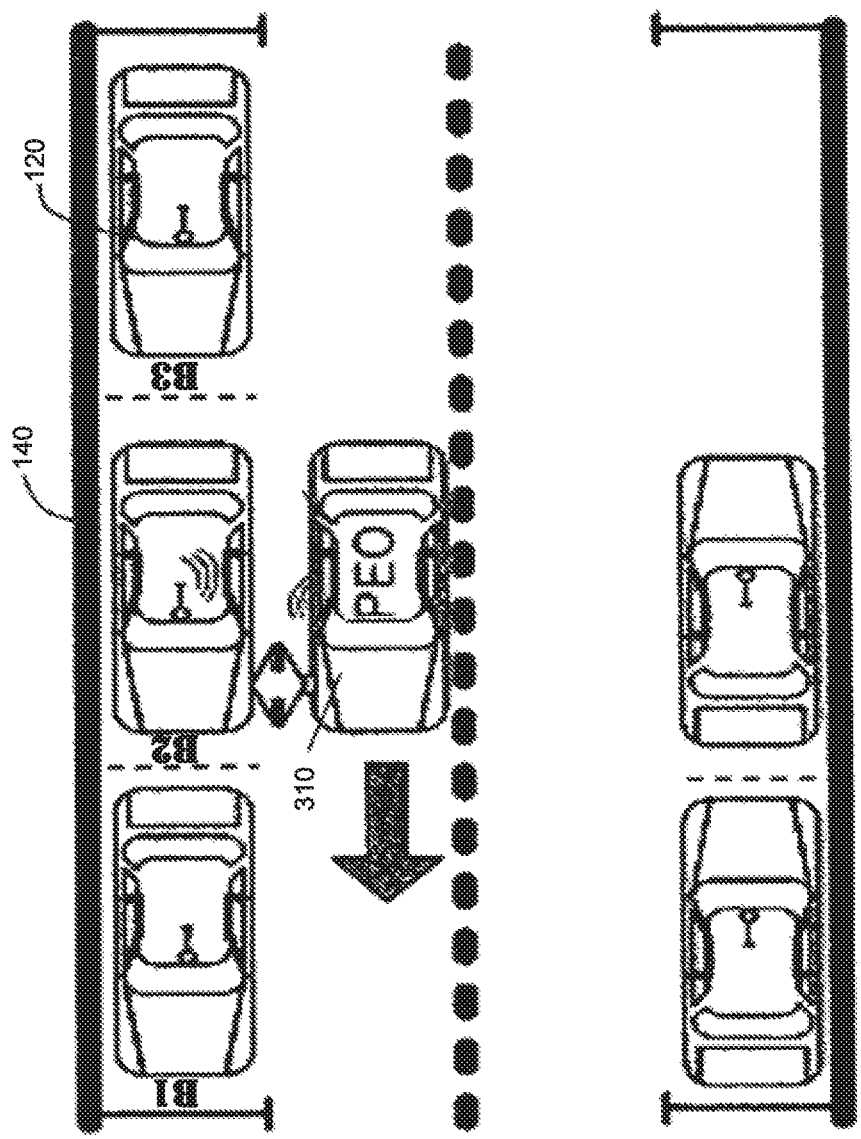
FIG. 3 is a block diagram depicting a mobile enforcement vehicle on patrol in accordance with an example embodiment.

FIG. 3 illustrates an example embodiment of a PEO operating a mobile enforcement vehicle 310 to patrol various parking stalls. Details regarding the mobile enforcement vehicle have been described in issued U.S. Pat. No. 7,355,527 ("Franklin") and is incorporated by reference herein. The vehicle in the present example embodiment is patrolling parallel parking stalls, travelling in a direction parallel to the orientation of the parked vehicles. It can be appreciated that the mobile enforcement vehicle may be either specifically configured to detect and patrol vehicles parked in various other types of parking stall configurations, including angled and rectangular parking stalls or generally configured to handle all configurations.

In some embodiments, the mobile enforcement vehicle may travel at a speeds of typically 50-km/h along its patrol route, while scanning parking stalls and parked vehicles but may go faster or slower depending on the circumstances. The mobile enforcement vehicle generally cannot see around a parked vehicle to verify parking stall numbers in order to differentiate one parking stall from another, unlike handheld enforcement which permits the PEO to easily ascertain the parking stall number and delineate one stall from another by moving around a parked vehicle to identify various visual clues associated with the parking stall and the parked vehicle. Accordingly, one of the challenges that may be faced by the mobile enforcement vehicle in pay-by-space parking is with respect to differentiating one parking stall from another and identifying the corresponding parking stall number.

To improve the scanning accuracy of the mobile enforcement vehicle, parking stall signs indicating the parking stall number may be provided proximally to the parking stalls so as to permit the patrol vehicle's vision system to read them. The parking stall signs may be designed to minimize image sensor blooming effects to enhance visibility. For example white lettering on a black background may be used to improve image contrast to compensate for blooming effects. Using flat black and non-reflective backgrounds upon which light coloured letters and numbers are printed tends to enhance visibility, clarity and legibility of parking stall signs. The text colouring for printing on a dark background may include white or yellow to provide optimal legibility. In other instances, specific font faces may be preferable to make machine readable signs. For example, spatial fonts can be used such that expansion due to detector blooming does not crowd into the adjacent letters. Choosing a larger font size for the sign can also improve visibility, clarity and legibility. Other physical attributes of the signs may also help improve machine readability. For example the addition of hooding or other methods to prevent excess light from causing image overexposure may help reduce sensor blooming. In some other examples, the surfaces of the signs may be coated with a material such as silicone to shed water, dirt, snow, ice, and other debris to enhance visibility. The various techniques described herein are not intended to be exhaustive and are intended as examples that can be used alone or in combination to improve the visibility, clarity and legibility of parking stall signs.

The captured image of the stall sign can then be processed using optical character recognition (OCR) to identify the stall number. In some cases, the captured images may be additionally or alternatively be reviewed and recognized by a reviewing PEO or clerk.

In some cases, the camera used to capture the parking stall sign may also be used to capture other scene information, such as, for example, background and foreground information around the parking stall sign. This may further assist with identifying the parking stalls uniquely by capturing and processing additional information, such as surrounding parking stall identification, road surface markers representing stall demarcation (such as white paint on the ground), etc. In some embodiments, the camera used to capture foreground, background and the parking stall sign should preferably be capable of generating an image whose image resolution corresponds to a minimum of a megapixel level, such as, for example, a resolution of 4 megapixels.

The vision system of the mobile enforcement vehicle may also comprise a number of cameras to obtain vehicle-identifying information including the license plate number, colour, the make and model, the vehicle's profile, etc. In some embodiments, a contactless speed measurement device, such as a Doppler microwave speedometer, may be used to determine the precise speed of the mobile enforcement vehicle so as to allow precise triggering of the positioning and vision system to capture an image of a parked vehicle within the field of view of the camera and provide very precise GPS coordinates. In other embodiments, a dedicated license plate camera may be used as a part of a license plate reader (LPR) system. This dedicated camera may also be used to capture additional information including stall demarcation to provide redundancy.

In yet other embodiments, machine-readable wireless transponders or radio-frequency identification ("RFID") tags encoded with the parking stall number may be used as stall signs instead of OCR-compatible signs. In this implementation, the mobile enforcement vehicle may be equipped with a narrow-beam reader to read the transponder or RFID tags to identify the parking stall number. It would be appreciated that the narrow-beam reader is highly directional so that the mobile enforcement vehicle would be able to read the transponder or tag only when the beam is aimed at the tag from a certain direction. A narrow-beam reader may help avoid "false readings" of nearby sparking stall tags and thereby increase the likelihood of correctly identifying the stall number of the parking stall being patrolled. Since the mobile enforcement vehicle may rely on a positioning system such as an onboard GPS to determine which parking stall it is proximal to, implementation of transponder or RFID stall tags may be useful in situations where a GPS signal is generally not available, such as in underground parking lots or indoor parking stalls. In environments where the GPS signal is available, the use of transponders or RFID tags may allow relaxation of the precision required of the positioning system.

Another challenge that may be faced by the mobile enforcement vehicle is the task of associating a parked vehicle to a parking stall. In other words, given the proximity of parking stalls and parked vehicles, the mobile enforcement vehicle may be required to "place" a parked vehicle into the correct parking stall. The method used to determine whether a vehicle is stationary or in motion has been previously described in issued U.S. Pat. No. 7,355,527 ("Franklin") and is incorporated by reference herein. Having entered a parking zone defined as Pay-by-Space and detecting a parked vehicle, the mobile enforcement vehicle 310 may proceed to determine which parking stall the vehicle is occupying. To do so, the position (e.g. GPS coordinates) of the parked vehicle should preferably be determined as precisely as possible so that the parked vehicle can be "placed" into the boundaries of the parking stall as defined by the four corners of the stall. In some embodiments, the relative positioning between the parked vehicle and the mobile enforcement vehicle 310 may be used to determine the position the parked vehicle. Since the GPS coordinates of each parking stall may be recorded prior to its use, the mobile enforcement vehicle 310 may therefore use its own GPS coordinates to determine the GPS coordinates of the parked vehicle and associate that parked vehicle to a given parking stall.

Figure 4:
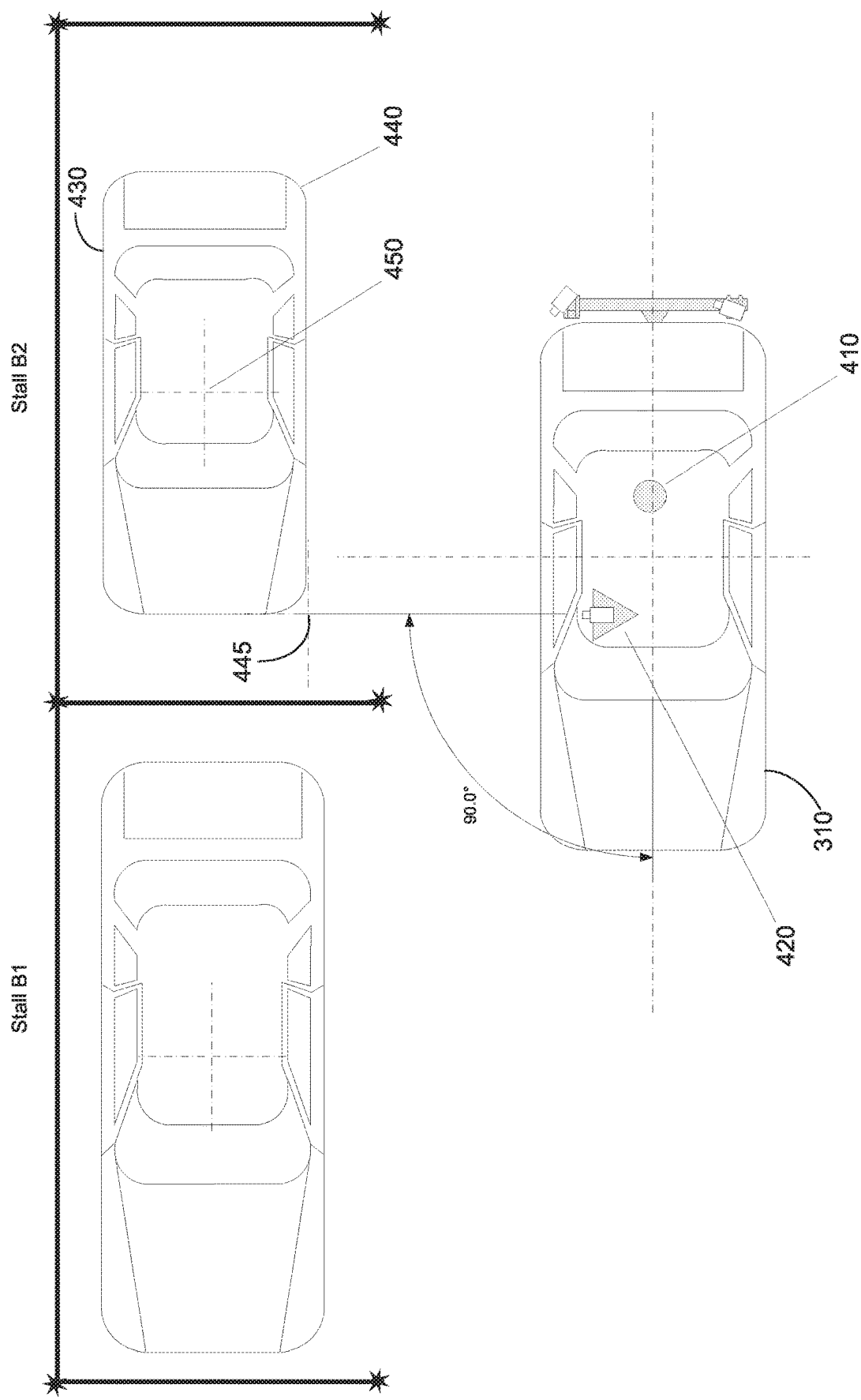
FIG. 4 is a block diagram illustrates determining the position of a parked vehicle in accordance with an example embodiment.

FIG. 4 illustrates one embodiment in which the position of a parked vehicle may be determined based on relative positioning. The mobile enforcement vehicle 310 may be equipped with a GPS system 410 used to determine the position the mobile enforcement vehicle 310 as it patrols the various parking stalls. An accurate GPS system may be desirable to determine the GPS position the mobile enforcement vehicle 310, from which the GPS coordinates of the parked vehicle 430 can be ascertained.

In some embodiments, where real-time determination of parking violations is not necessary, inertia equipped GPS may be used to obtain high-accuracy positioning data (generally to within 2.5 meters) using post-processing techniques. In such instances, post-processing refers to the collection of GPS and associated data during a patrol and processing the collected data at a later time after the patrol to enhance the accuracy of the positioning data. Such a technique may yield high accuracy results even in challenging environments such as urban locations where GPS signal interference as a result of multi-path signal propagation is commonplace. Post-processing of the vehicle GPS data using secondary GPS information obtained from a fixed-location GPS source may be used to apply environmental corrections to reduce uncertainty of the measured GPS locations.

In one example, while on patrol, satellite information from multiple navigation or positioning sources such as the Global Positioning System (GPS), the Global Navigation Satellite System (GLONASS) and the Galileo navigation satellite system etc. is logged in real-time by the mobile enforcement vehicle. The data collected include but is not limited to latitude, longitude, altitude, satellite geometry, estimated errors, number of satellites in communication with the mobile enforcement vehicle and date/time. Simultaneously, the mobile enforcement vehicle can also collect detailed logs of outputs from onboard gyroscopes, accelerometers, digital compasses or any other measurement device that can later be used to improve the GPS positioning in challenging environments. At the moment that a parked vehicle is detected by the mobile enforcement vehicle, the GPS time corresponding to this event is logged and saved along with other data such as, but not limited to latitude, longitude, bearing, and orientation of the mobile enforcement vehicle, and the dimensions and photographs of the parked vehicle. Next, all of the logged information is synchronized to a database server or any suitable data storage device for post processing. Any inaccuracies of the real-time GPS data is then corrected by blending in the various complementary device data as well as the secondary GPS base station data by going backwards and forwards in time until the data converges to a solution. The mobile enforcement vehicle GPS time stamps associated with the detection of the parked vehicle ("detection event") is then cross-referenced against the corrected GPS data. For example, two data points from the corrected data set whose associated time stamps correspond to a time just before and just after the detection event can be used to estimate the position of the parked vehicle at the precise time of the detection event through data interpolation. This is required because the sampling rates of the corrected GPS data may vary and will often never exactly match the GPS time stamps of the real-time GPS data unless an infinite sampling rate was used.

It can be appreciated that to correctly associate a parked vehicle within a parking stall, precise determination of the GPS coordinates of that vehicle is necessary. A variance or uncertainty of, for example, 5 meters is unacceptable since this value can be large enough to offset the parked vehicle into neighboring parking stalls.

In the various embodiments disclosed herein, the GPS coordinates of the mobile enforcement vehicle are used to determine the GPS coordinates of the parked vehicle. In the present embodiment, the mobile enforcement vehicle 310 may further be equipped with a laser triggering system 420 configured to detect a parked vehicle with precision, determine the proximity between the parked vehicle and patrol vehicle, and to measure the dimensions of the parked vehicle. For example in some embodiments, the laser triggering system 420 is oriented perpendicular to the longitudinal axis corresponding to the length of the mobile enforcement vehicle. In some other embodiments, the laser triggering system 420, is angled (i.e. sloped) downwards at 25 degrees relative to a horizontal reference plane while emitting a beam that is 90 degrees to the direction of the mobile enforcement vehicle. It should be noted that the mounting angles of the laser described here are merely examples of possible mounting configurations. In the various embodiments disclosed herein, the angle of the laser triggering system in the lateral direction or vertical direction (i.e. the angle of slope) generally depends on the mounting position of the laser triggering system on the mobile enforcement vehicle 310 as well as characteristics of mobile enforcement vehicle 310 (e.g. size, height etc.) upon which the laser triggering system is mounted.

As the mobile enforcement vehicle 310 passes the parked vehicle 430, the laser may trigger as it detects the corner at one end 440 of the parked vehicle 430 and scans across the parked vehicle to the corner at the other end 445 at a given sampling or scanning frequency. If the vehicle is parked in parallel to the direction of travel of the patrol vehicle as illustrated in FIG. 4, the laser may scan along the length of the parked vehicle 430 to determine its length. If the vehicle is parked perpendicular to the direction of travel, then the parked vehicle's width may be scanned to determine the width of the parked vehicle 430. This method of scanning may allow the mobile enforcement vehicle to determine the length or width (whichever the case may be) accurate to approximately 8 centimeters. Combined with the detected speed of the mobile enforcement vehicle and collected GPS data, the positioning of the first 440 and second end 445 of the parked vehicle may be determined.

Furthermore, the laser 420 may also indicate the distance between patrol vehicle and the parked vehicle. Based on this information as well as the precise GPS position of the patrol vehicle, the GPS coordinates of the center of the parked vehicle 430 may be calculated using, for example, the Vincenty Direct formula. For example, as illustrated in FIG. 4, if the vehicle is parked parallel to the direction of travel of the mobile enforcement vehicle, then the center of the parked vehicle 450 can be determined by 1) adjusting the GPS position of the patrol vehicle at the completion of the laser scan by offsetting (i.e. moving back) that position by an amount equivalent to half the length of the parked vehicle in the axis corresponding to the vehicle's length and 2) offsetting (i.e. moving over) the GPS position of the mobile enforcement vehicle at the completion of the scan by half a standard width of a vehicle (standard widths may be used since the actual width is unknown) plus the lateral distance between the parked vehicle and the mobile enforcement vehicle in the axis corresponding to the parked vehicle's width.

The parked vehicle 430 may then be associated to a given parking stall by comparing the GPS coordinates of the stall and the parked vehicle 430. In one embodiment, the GPS coordinates corresponding to the four corners of the parking stall may be used to set the boundaries and the geometric center of the stall, and the geometric center of the stall may be compared to the GPS coordinates of the parked vehicle to associate the parked vehicle 430 to a given parking stall.

In another embodiment, the accuracy of the process of associating a parked vehicle to a given parking stall may be enhanced using a laterally extended polygon based on the direction of travel of the mobile enforcement vehicle 310. The polygon may be defined to encapsulate the geometric center of the parking stall to better reduce lateral GPS errors. Therefore if the center of the parked vehicle 430 is contained within the extended stall polygon, then it may be concluded that the parked vehicle is occupying the stall. The polygons used in this embodiment may be of any shape, including triangles, rectangles, and squares etc. In some cases, in order to maintain accuracy to within a 2.5 meter radius, a square polygon is preferred when dealing with a rectangular parking stall.

The information collected while parked vehicles are scanned by the mobile enforcement may be processed in real-time or in batches in a post processing procedure. If post processing is performed, GPS data enhanced with data provided by the mobile enforcement vehicle's inertial guidance system (e.g. gyroscopic plus speed measurements, as described previously), may be combined to obtain positioning accuracy to less than 2.5 meters, even under environmental conditions where GPS signal reception is not ideal.

Enforcement of Pay-by-Space Parking

In some embodiments, the central processor along with the database may be used to manage and track the usage of each parking stall for a given parking lot or parking area. FIG. 5 illustrates an example of the various fields of the database 500. The database may be used by the central processor to store and retrieve parking enforcement rules imposed on a given parking stall within the parking lot to facilitate identification of parking violations.

In some embodiments, the database may comprise a "Parking stall No." field 510 which stores the unique parking stall numbers corresponding to each parking stall being managed. The "Stall Type" field 520 may be used to specify the type of parking stall. For instance, type 'A', 'P' and R may refer to angled, parallel and rectangular stalls, respectively. The "Stall Coordinates" field 530 may be used to indicate the GPS coordinates of each corner of the parking stall. Using information concerning the type of stall indicated in the "Stall Type" field 520 and "Stall Coordinates" field 530, the boundaries of any given parking stall may be ascertained by the central processor or the mobile enforcement vehicle associate a parked vehicle to a parking stall.

The "Occupied?" field 540 may be used to specify whether a given parking stall should be occupied (i.e. it may be occupied if it has been paid for). If a parking stall has been paid for, the "Payment Time" field 550 and the "Expiry Time" field 560 may be populated with the time payment was made (i.e. indicating the parking start time) and the time the parker should vacate the stall (i.e. parking end time), respectively. Finally, the "Stall Data" field 570 may be used to store vehicle-identifying information obtained from the vision system of the mobile enforcement vehicle 310 such as the license plate number, colour, vehicle profile etc. The "Stall Data" field 570 may store one or more datasets to form a dataset group 575, wherein each dataset may contain vehicle-identifying information observed at a given parking stall during a patrol. For instance, dataset 571 may correspond to data recorded from the most recent patrol and data set 572 may correspond to the immediately preceding patrol. In some embodiments, each data set may be time-stamped to specify the time at which the data was acquired so as to permit the central processor to track the use of the parking stall. Therefore, the dataset group may provide useful stall-specific usage information for the parking authority. This information may be used to determine optimal patrol schedules and patrol routes.

Figure 6A:
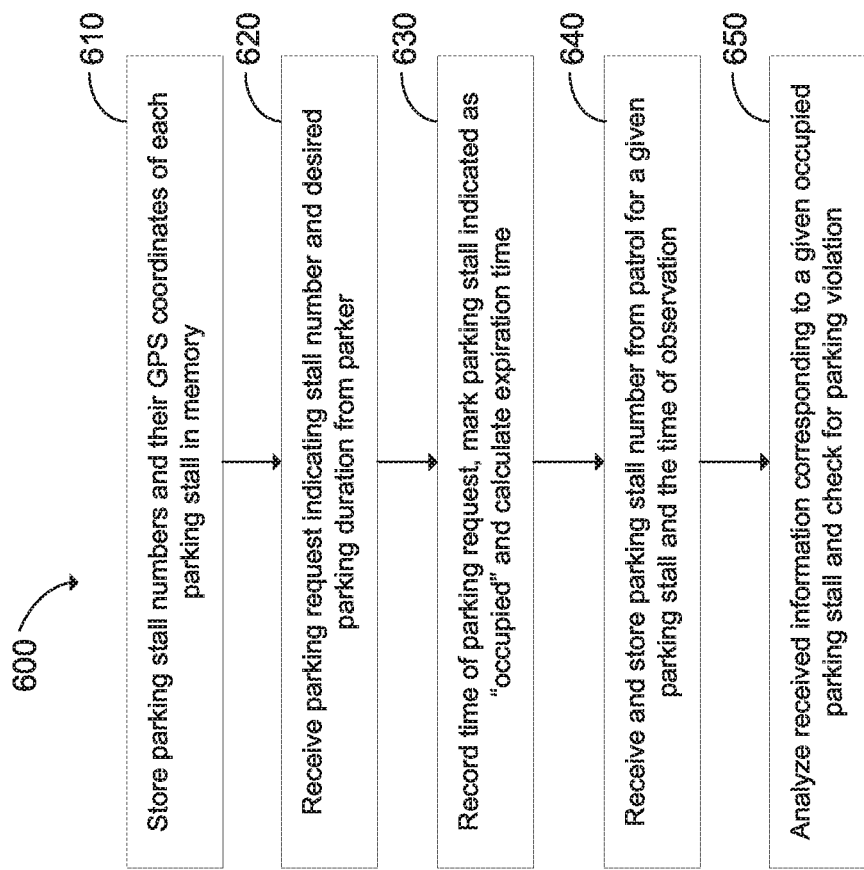
FIGS. 6A-6B is a process flow diagram for pay-by-space enforcement in accordance with an example embodiment.
Figure 6B:
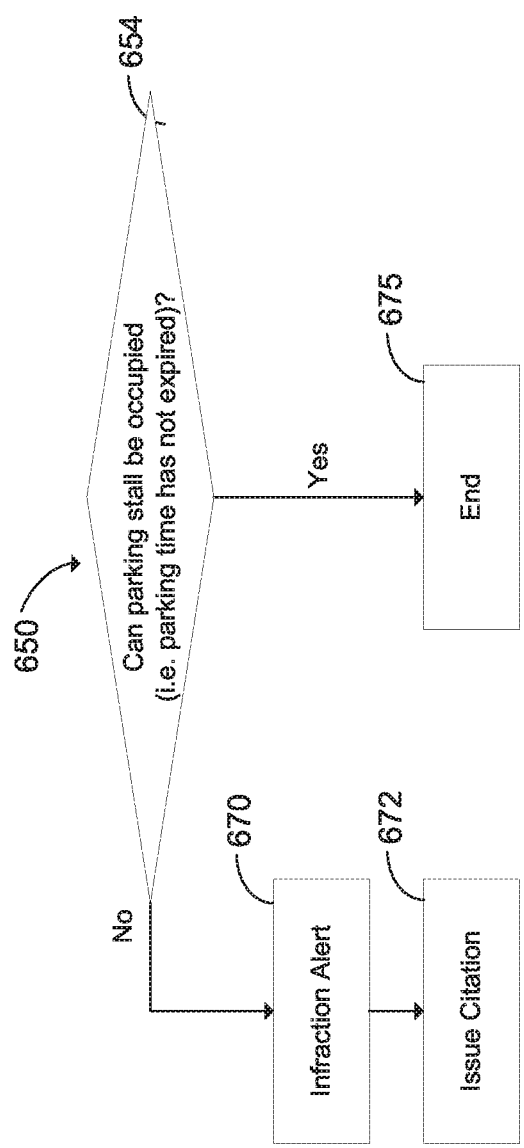

Referring now to FIGS. 6A and 6B, shown therein is a process flow diagram illustrating method 600 for a basic pay-by-space parking enforcement. The method 600 begins at step 610 such that, prior to parking stall use, the GPS coordinates of each parking stall in the parking area may be determined and stored into the database. During use of the parking area, at step 620, a parking request may be received by the central processor from a parker indicating the stall number corresponding to the stall used by the parker and the desired parking duration. The parking request may be generated by a parking kiosk, parking meter, an application operating on the parker's smartphone or any other appropriate generation method. In some embodiments the parking request may also include payment information for the central processor. In other embodiments, the parking kiosk or parking meter may handle payment separately.

At step 630, the information received from the parker may be recorded in the database. For example the time of the parking request may be recorded in the "Payment Time" field 550 of FIG. 5, and the status of the parking stall may be updated by the central processor to indicate "occupied" in the "Occupied?" field 540. The corresponding expiration time may be calculated using the time of payment and the desired parking duration indicated by the parker.

While on patrol, the mobile enforcement vehicle may scan the parking stalls to determine the stall numbers and transmit this information along with the time of scan (i.e. time of observation) to the central processor. In some embodiments, the mobile enforcement vehicle may scan both empty and occupied stalls. The mobile enforcement vehicle may indicate to central processor whether or not the transmitted stall number corresponds to an empty or an occupied stall using an appropriate indicator. In some embodiments, the mobile enforcement vehicle may transmit parking stall information as they are scanned, in real-time. In other embodiments, the scans may be made first and transmitted later in batches. At step 640, the central processor may receive and store the parking stall numbers of occupied parking stalls and the time of observation. Next, at step 650, the central processor may proceed to analyze the received information for the identified stall if it is occupied to determine whether there is a parking violation.

FIG. 6B depicts a process flow diagram showing further details of step 650 of FIG. 6A in which a parking violation may be detected at a given parking stall. At decision step 654, the central processor may query the database to determine whether or not, at the time of observation, the parking time for the identified parking stall has expired. This determination may be made using the parking expiration time stored in the "Expiry Time" field 560 of FIG. 5 and the time of observation received in step 640. In other words, the central processor checks to determine whether the parking stall in question has been paid for at the time of observation.

If the time of observation is a later time than the time of expiration, then the parking stall should not be occupied (i.e. answering "No" at decision step 654), since the parking time has expired. In this case, the method proceeds to step 670 to trigger an infraction alert. In some embodiments an infraction alert may be indicated by setting a violation status indicator associated with the parking stall to indicate a violation. The status indicator may subsequently be transmitted to the mobile enforcement vehicle at step 672 so that a citation may be issued. In the alternative, if the parking stall has been paid for, no infraction has occurred, status indicator is set to indicate that no violation has occurred and the method proceeds to step 675 in which the method 600 may end. The central processor may notify the mobile enforcement vehicle via the status indicator that there is no infraction and the mobile enforcement vehicle may move on to the next occupied parking stall.

The procedure illustrated by method 600 allows the parking authority to determine a window of time or parking period during which a parker is allowed to park. This window of time may be defined using a time of day corresponding to the start of the parking period (e.g. the time of the parking request made) and a time of day corresponding to the end of the parking period (e.g. the expiration time where vehicles are not allowed to occupy the stall). In the illustrated embodiments of FIGS. 6A and 6B, a vehicle may use this parking stall within the window, while use of the same parking stall outside of this window would result in issuance of a citation. For example, if a parker makes a parking request for a given parking stall at 10 am for two hours, then the central process may determine that the parking window or parking period runs from 10 am to 12 pm, where 12 pm is the parking expiration time. Accordingly, a vehicle parked in the parking stall within this window will be allowed to park without any violations or citations.

In the illustrated embodiments of FIGS. 6A and 6B, it is assumed that as long as the parking stall is paid for, any vehicle can park in that stall within the allowed window without resulting in any violations or issuance of citations. Such a policy may be governed by the laws and/or practices of each jurisdiction, and may differ from one jurisdiction to another. For example, using the example above, in one jurisdiction, if the parker who paid for parking at 10 am for two hours vacates the parking stall at 11 am, a subsequent parker may occupy that stall, for free and without any violation, from 11 am to 12 pm. However, in some other jurisdictions, as discussed below, the practice and/or the law may require every new parker to pay for whatever time they use, even if it completely overlaps the previously paid time. In other words, even if a parking stall is paid for from 10 am to 12 pm, a new parker parking in the parking stall at 11 am will be required to pay for the entire time that parker decides to park in the parking stall, even if it results in double billing from 11 am to 12 pm. This discussed in more detail below with reference to, for example, FIGS. 7A and 7B.

Referring back to FIGS. 6A and 6B, it would be appreciated that the preceding description of pay-by-space enforcement may be subject to detection of infractions where an infraction should not be issued. For example, it would not be fair to the parker if, shortly after parking the vehicle but before the parker reaches the parking kiosk to pay, a mobile enforcement vehicle patrols the recently parked vehicle and issues a citation (i.e. parking outside the window). Therefore, it may be preferable for the parking authority to provide a grace period to allow the parker to park his or her vehicle and to then proceed to pay for parking at a parking kiosk located some distance away from the chosen parking stall. In the various embodiments disclosed herein, automated post processing methods may be applied to reduce the incidences of incorrectly identifying a parking infraction. For instance, post-processing may be used to introduce parking grace-periods (e.g. 10 minutes) before and after the parking session ends. If, for example, parking citations are processed and consolidated in a post-processing procedure at the end of the day, then the central processor would have detected that shortly after issuing a citation for the parking stall (for example, within 2 minutes), a parking request was made for that stall. If a grace period policy was in place, then the central processor may be configured to waive the citation since it was likely issued in error. This post-processing step may also be applied to accommodate a parker wishing to extend his/her parking time by adding more funds to a just-expired parking stall.

In the various embodiments disclosed herein, other methods of automated post processing may also be applied to reduce the incidences of incorrect parking infractions. For example, GPS positioning corrections such as those described above may be applied to enhance identification of the correct parking stall, which may be particularly useful when the mobile enforcement vehicle is operating in dense urban areas where satellite navigation signals are prone to multi-path distortions. Identification of the correct parking stall may be further enhanced using reference photo(s) background (e.g. those that are images of the parking stall only, without the presence of a parked vehicle) and compared to those acquired by the mobile enforcement vehicle during its patrols. Optionally, the enhanced data can be further reviewed manually by a PEO to efficiently step forward or backward between images of the parking stall being examined with neighbouring stalls and between references images and images acquired during the patrols.

Under the basic enforcement method of FIGS. 6A and 6B, as discussed above, if a parker leaves a parking stall with remaining parking time, a subsequent parker may park at the stall without payment for at least the duration of time equal to the remaining time without triggering an infraction alert. In other words, as long as a parking stall is paid for, no parking violation is detected irrespective of who paid for the parking.

In some instances, the parking authority may desire that all new parkers must pay for parking even if the stall used by the new parker has unused time remaining. For example, some jurisdictions have a policy that specifies that the new parker must pay for whatever time they use, even if it completely or partially overlaps with the previously paid time. One method of enforcing such a policy may be to avoid indication of the time remaining for a parking stall so that subsequent parkers would be unaware of whether the parking stall may be used for free. However, a previous parker can nonetheless inform a subsequent parker that a given stall has unused time. Alternatively, a previous parker can pass his or her parking voucher, obtained at the time payment for parking was made, to a subsequent parker so that the latter party can continue to use a given stall for free.

The issue of voucher pass-backs may be addressed with the assistance of the mobile enforcement vehicle. It may be understood that the mobile enforcement vehicle may patrol a parking area on a regular basis to identify parking violations. Therefore, the mobile enforcement vehicle may be used to determine whether a parker is "invalidly" using a paid-for parking stall. In this instance, an "invalid" use constitutes a subsequent parker using a previous parker's remaining unused parking time for a given parking stall.

Figure 7A:
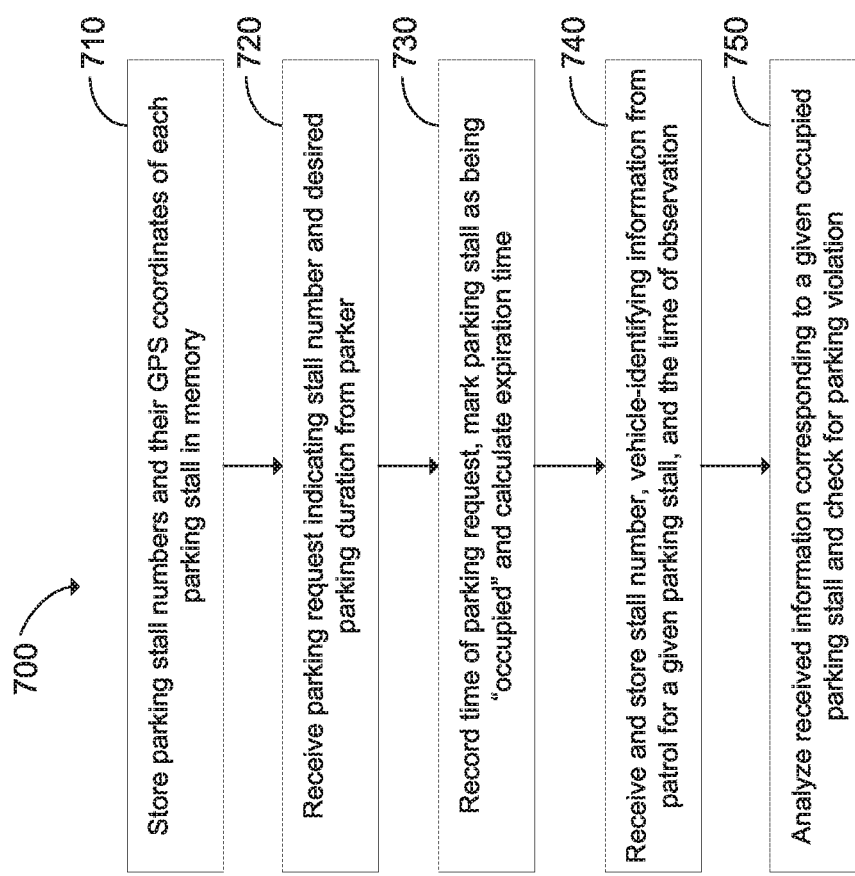
FIGS. 7A-7B is a process flow diagram for pay-by-space enforcement using license plate information in accordance with an example embodiment.
Figure 7B:
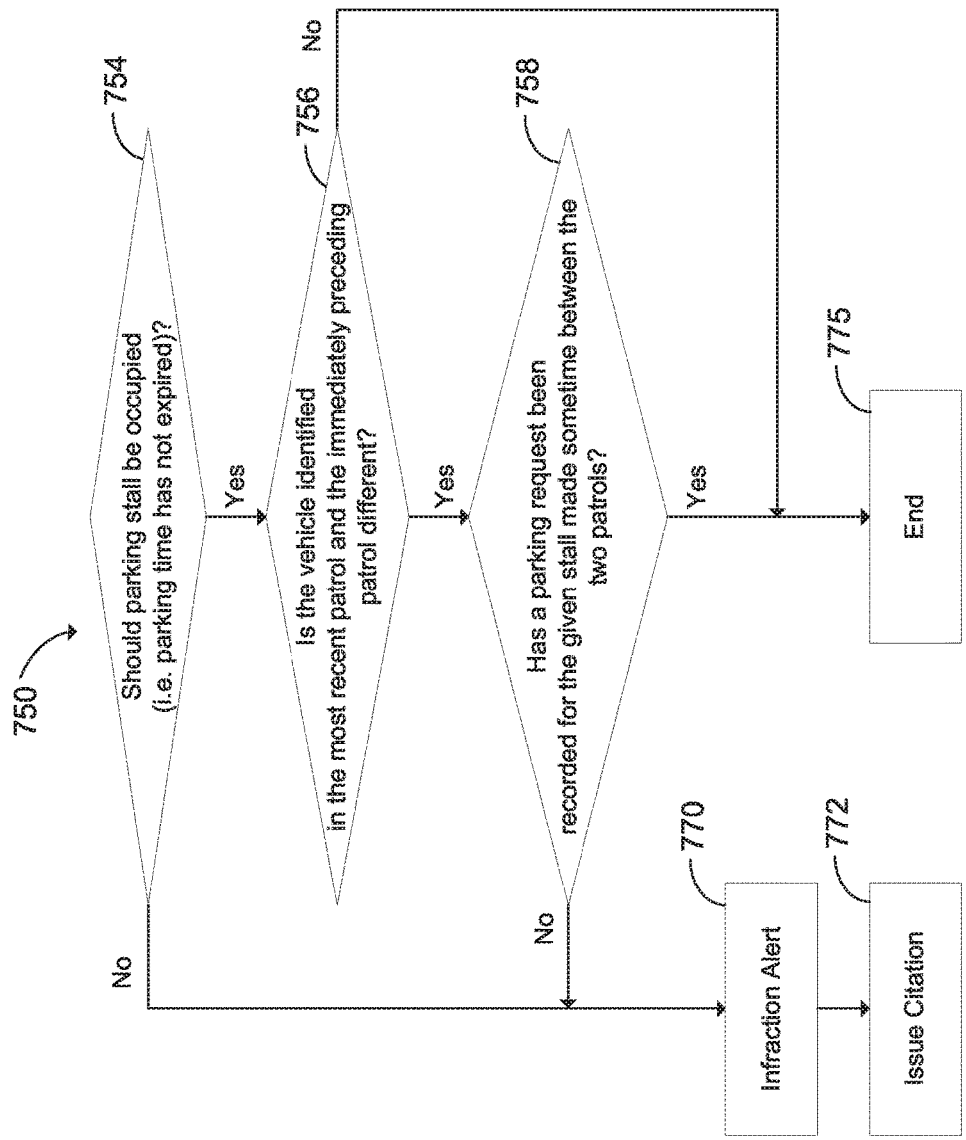

FIGS. 7A and 7B show a process flow diagram illustrating method 700 of pay-by-space parking enforcement for detection invalidly parked vehicles. Steps 710-730 of method 700 correspond to steps 610-630 of method 600 described previously. While on patrol, the mobile enforcement vehicle may scan the parking stalls to determine the stall numbers and transmit this information along with the time of scan (i.e. time of observation) to the central processor. In some embodiments, the mobile enforcement vehicle may scan both empty and occupied stalls. The mobile enforcement vehicle may indicate to central processor whether or not the transmitted stall number corresponds to an empty or an occupied stall using an appropriate indicator. In some embodiments, the mobile enforcement vehicle may transmit parking stall information as they are scanned, in real-time. In other embodiments, the scans may be made first and transmitted later in batches.

During the patrol of the parking stalls, the mobile enforcement vehicle may also scan and transmit vehicle-identifying information of the vehicle occupying a given stall, the stall number and the time of observation to the central processor. The information may include one or more identifies, such as the license plate number, make and model and the colour of the vehicle. At step 740, the central processor may receive the parking stall numbers, vehicle-identifying information and the time of observation. The central processor may proceed to associate the vehicle-identifying information to the identified parking stall, along with any previously received information (e.g. those obtained at time of payment by the parker or an earlier patrol). In some embodiments, if the parking vouchers are RFID enabled, the mobile enforcement vehicle may be equipped with an RFID reader to read and transmit to the central processor the parking voucher identification ("ID") number. At step 750, the central processor may analyze the received information corresponding to the identified stall if it is occupied to determine whether there is a parking violation.

FIG. 7B depicts a process flow diagram showing further details of step 750 of FIG. 7A in which a parking violation may be detected at a given parking stall. At decision step 754, the central processor may query the database to determine whether or not, at the time of observation, the permitted parking time at the identified parking stall has expired in a manner similar to step 654 of FIG. 6B. If the parking stall should not be occupied (i.e. answering "No" at decision step 754 because the parking time has expired) the method may proceed to steps 770 and 772 to issue a citation in a manner similar to steps 670 and 672 of method 600 described in FIG. 6B. If the parking stall is paid for (i.e. answering "Yes" at decision step 754), the method may proceed to decision step 756 where a comparison of the vehicle-identifying information obtained for the given parking stall during the most recent patrol and the immediately preceding patrol is made. If no difference is observed in the comparison, then it may be concluded that the same vehicle has been occupying the paid-for parking stall during the two patrols and the vehicle is validly parked (i.e. answering "No" at step 756) so the method may proceed to step 775 in which the method may end.

In the alternative, if the comparison of vehicle-identifying information at step 756 indicates that there is a difference (i.e. answering "Yes" at decision step 756), the difference may suggest that a new parker has occupied the parking stall at some time between the two patrols, and the method proceeds to decision step 758. At decision step 758, the central processor may determine whether a parking request and payment for the stall in question has been made by the new parker. In the present embodiment, the central processor may query the database to determine whether a parking request and payment for the parking stall in question was made between the two patrols. Where a parking request and payment has been made (i.e. answering "Yes" at step 758), then it may be concluded that the vehicle parking in the stall is a new vehicle which has paid for parking, and is thus validly parked. The method may proceed to step 775 and the method ends. Otherwise, it may be concluded that the parked vehicle is using a previous parker's unused parking time and that a citation should be issued (i.e. answering "No" at step 758) and the method proceeds to step 770 to trigger an infraction alert. As described in method 600, the violation status indicator for the parking stall may be set to indicate a violation and transmitted to the mobile enforcement vehicle. In turn, the mobile enforcement vehicle may make note of the status and issue a citation.

Figure 8A:
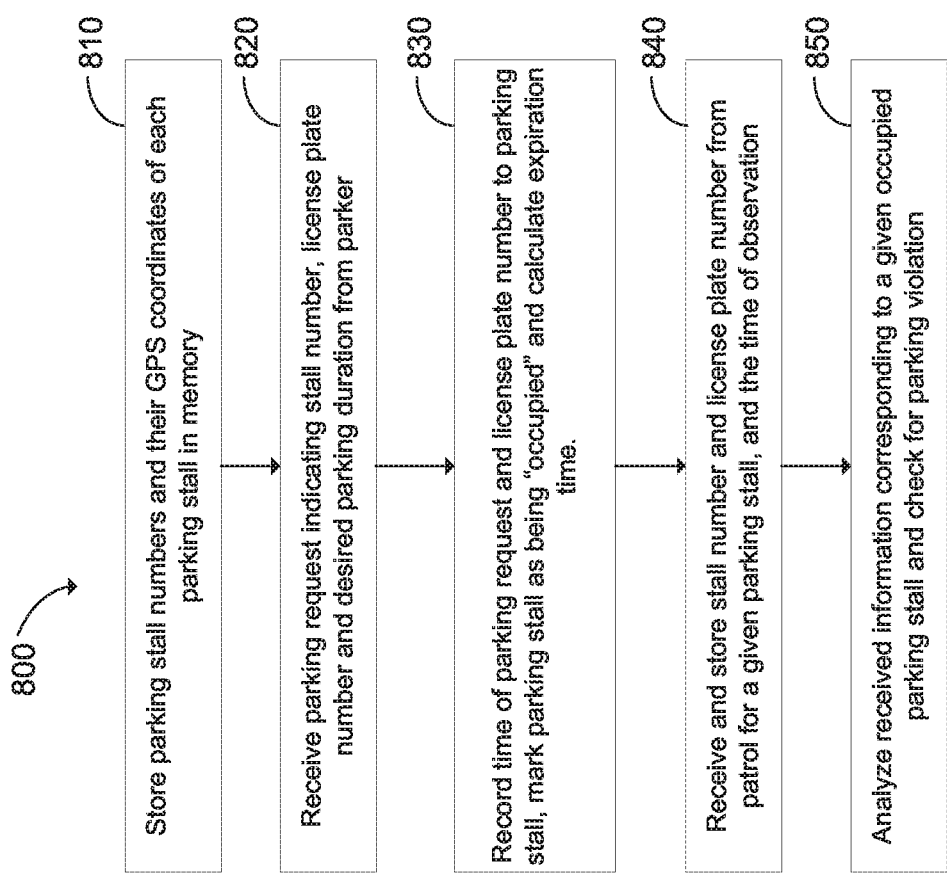
FIGS. 8A-8B is another process flow diagram for pay-by-space enforcement using license plate information in accordance with another example embodiment.
Figure 8B:
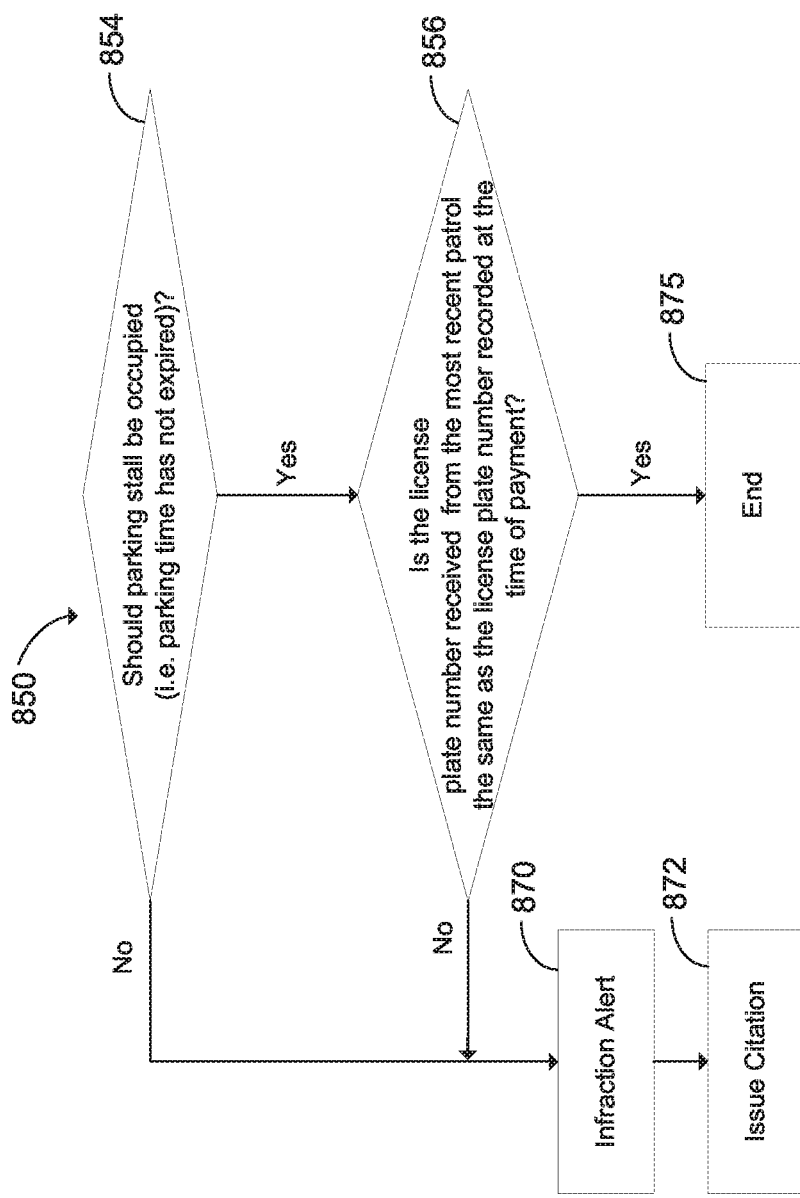

FIGS. 8A and 8B show a process flow diagram illustrating method 800 of pay-by-space parking enforcement which makes use of the parked vehicle's license plate number as vehicle-identifying information.

Steps 810-830 of method 800 are similar to steps 610-630 of method 600 described previously. However, in this method, the parker may be asked to provide the parked vehicle's license plate number as vehicle-identifying information at the time of payment. By providing secondary, vehicle-specific information such as the license plate number, the process of detecting parking violations for both the central processor and the mobile enforcement vehicle may be simplified. From the mobile enforcement vehicle's perspective, determining only the license plate number and the stall number may speed up the patrol process by reducing the amount of information that must be recorded. For the central processor, a parking violation (i.e. "invalid" parking) can be determined by simply comparing the license plate number identified by the parking enforcement vehicle and the license plate number obtained from the parker at the time of payment. In some cases, a difference in physical vehicle characteristics (e.g. size, shape or colour) may be observed which triggers a caution to indicate that additional scrutiny of the parked vehicle is required. For example, a PEO may be dispatched to obtain or verify the license plate number, the associated vehicle identification number (VIN) or both. The VIN number and the license plate number may be verified by cross-referencing the observed information with official vehicle registration information provided by a third-party database.

Asking the parker for secondary information such as the license plate number may allow for more advanced types of enforcement. For example, a particular parking authority may offer subscription-based pay-by-space parking in which a parking subscriber may be allocated a specific long-term parking stall. Long-term parking in this instance may include parking subscriptions which permit a parker to park at a given parking stall for more than one day. Parking subscriptions may be given at parking lots serving office buildings, hotels, and airports. In some embodiments of long-term pay-by-space parking, the parking authority may assign the parker a parking stall to a license plate. In other embodiments, the parking authority may permit the parker to specify multiple license plates so as to allow a parker owning multiple vehicles to use the same stall. Regardless of the parking arrangement made between the parker and the parking authority, subscription pay-by-space parking and on-demand pay-by-space parking may be enforced through the application of method 800 described further in detail below.

While on patrol, the mobile enforcement vehicle may scan the parking stalls to determine the stall numbers and transmit this information along with the time of scan (i.e. time of observation) to the central processor. In some embodiments, the mobile enforcement vehicle may scan both empty and occupied stalls. The mobile enforcement vehicle may indicate to central processor whether or not the transmitted stall number corresponds to an empty or an occupied stall using an appropriate indicator. In some embodiments, the mobile enforcement vehicle may transmit parking stall information as they are scanned, in real-time. In other embodiments, the scans may be made first and transmitted later in batches. During patrol of the parking stalls, the mobile enforcement vehicle may also record and transmit the license plate number of the vehicle occupying a given stall, the stall number and the time of observation to the central processor.

At step 840, the central processor may receive the parking stall number and license plate number, both of which may be contained in one or more photos acquired by the vision system, and the time of observation. When the information is received, the processor may associate the vehicle-identifying information with the parking stall, along with any previously received information (e.g. at time of payment by the parker or previous patrol) for the parking stall. At step 850, the central processor may analyze the received information corresponding to the identified stall to determine whether there is a parking violation.

FIG. 8B depicts a process flow diagram showing further details of step 850 of FIG. 8A in which a parking violation may be detected at a given parking stall. At decision step 854, the central processor queries the database to determine whether or not, at the time of observation, the permitted parking time at the identified parking stall has expired similar to step 654 of FIG. 6B. If the parking stall should not be occupied (i.e. answering "No" decision step 854 because the parking time has expired) the method proceeds to step 870 and 872 in a manner similar to steps 670 and 672 of method 600 described in FIG. 6B in which a citation should be issued for occupying an unpaid or expired parking stall.

If the parking stall is paid for (i.e. answering "Yes" at decision step 854), the method may proceed to decision step 856, where the license plate number obtained for the given parking stall from the most recent patrol and the license plate number obtained at the time of payment may be compared. If the comparison shows that the license numbers are the same, then it may be concluded that the same vehicle has been occupying the paid-for parking stall since the time of payment to the time of the patrol and the vehicle is validly parked (i.e. answering "Yes" at decision step 756). Therefore, the method may proceed to step 775 in which the method may end.

In the alternative, if the comparison of the license plate numbers at decision step 756 indicates that there a difference (i.e. answering "No" at decision step 756), the difference may suggest that a new parker began occupying the parking stall sometime between the time of payment and the time of the patrol. The difference may also suggest that the new parker may be using the previous parker's unused time. Accordingly, the method may proceed to step 870 and 872 to trigger an infraction alert and issue a citation, respectively. Similar to method 600, the violation status indicator for the parking stall may be set to indicate a violation and transmitted to the mobile enforcement vehicle. In turn, the mobile enforcement vehicle may make note of the status and issue a citation. In some instances citations may be issued after a review by the PEO or a clerk to verify the infraction. In other instances, citations are issued in real time and placed (served) on the windshield of the parked vehicle. Where citations are processed in batches (i.e. post-processed citations) after completion of a patrol, those citations are mailed to the owner of the vehicle.

Figure 9A:
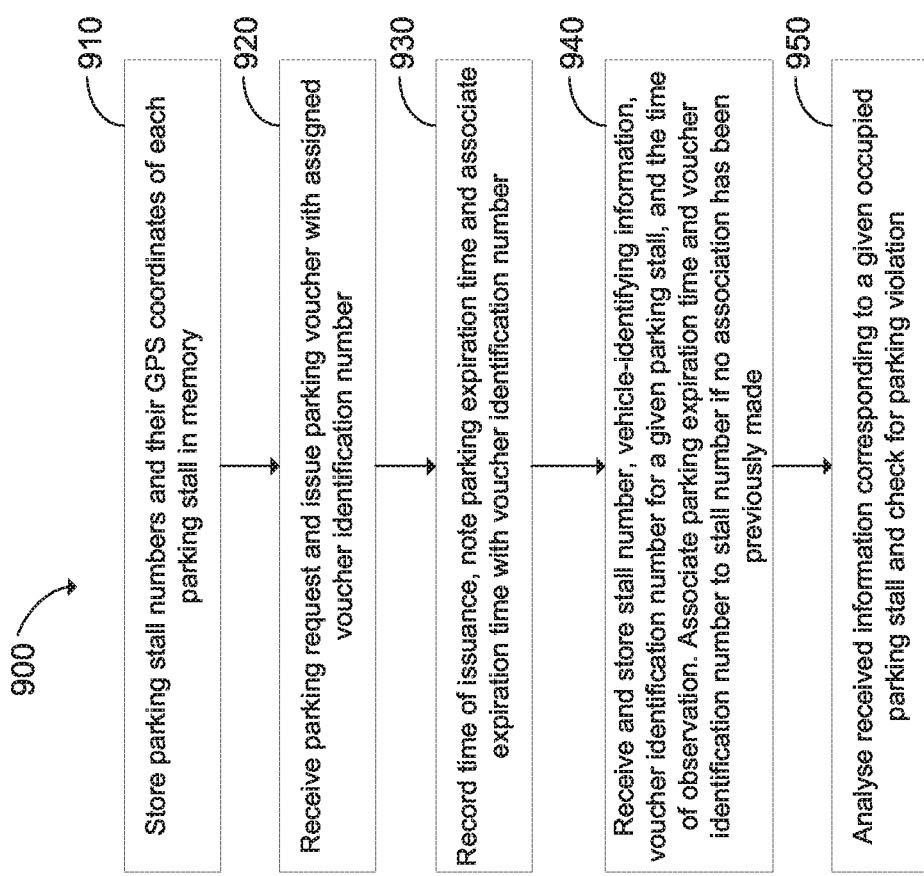
FIGS. 9A-9B is a process flow diagram for pay-by-space enforcement using voucher identification numbers in accordance with an example embodiment.
Figure 9B:
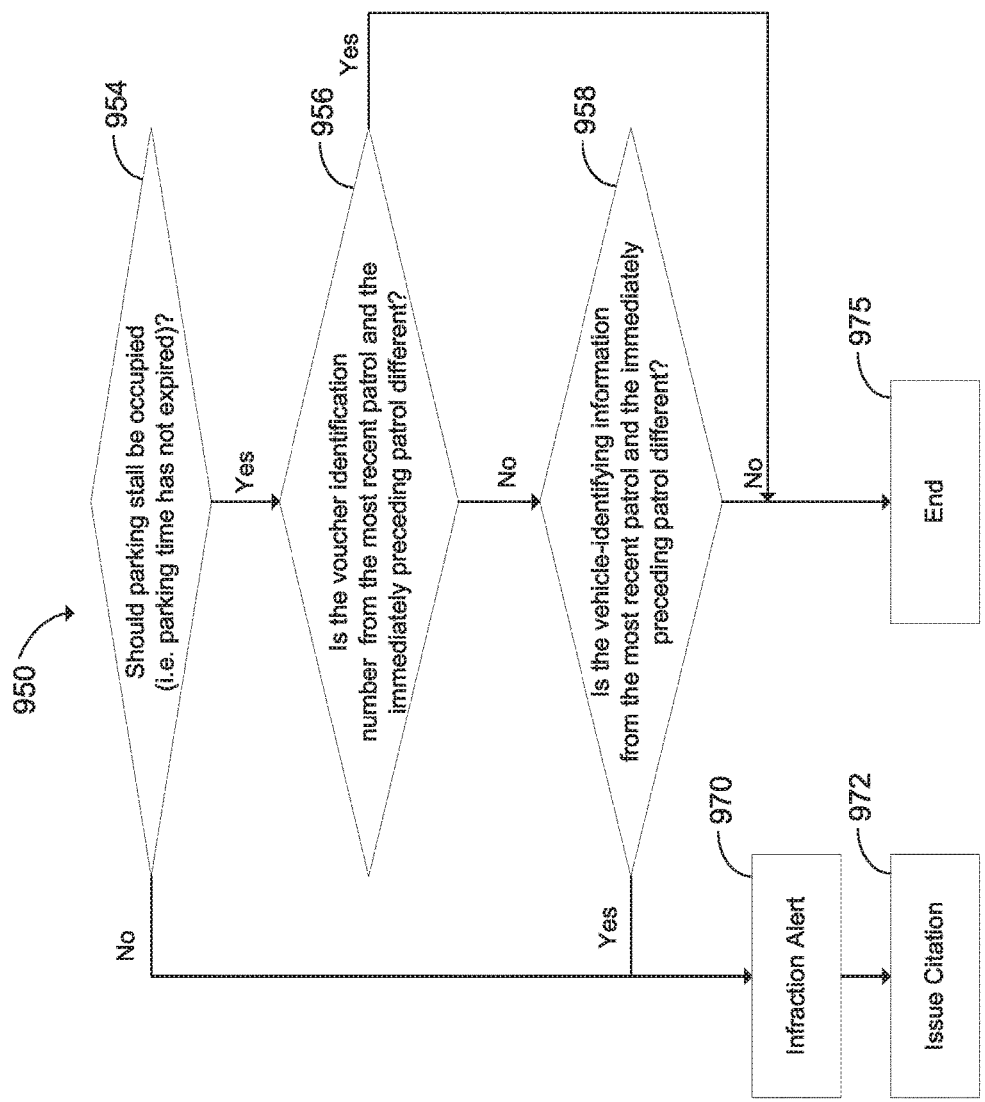

Referring now to FIGS. 9A and 9B shown therein is a process flow diagram illustrating method 900 of pay-by-space parking enforcement in which the parker does not provide any information to the central processor other than paying for a parking location (i.e. no parking stall information and no secondary vehicle information such as license plate information is provided by the parker at the time of payment). Steps 910-920 of method 900 generally correspond to steps 610-620 of method 600 described previously. However, step 920 further provides that a machine readable parking voucher with a uniquely assigned identification ("ID") number may be issued to the parker. The parker may be required to place the voucher on the front dashboard for display through the windshield or in any location of the parked vehicle that would allow scanning of the voucher by the mobile enforcement vehicle. In some embodiments the unique identification number may be encoded within an RFID tag so that the mobile enforcement vehicle equipped with an RFID reader may read the encoded voucher ID number as the vehicle moves along its patrol route. In other embodiments, an optically scannable image corresponding to the ID number, such as a barcode or QR code, may be used to encode the voucher ID number, which may require the parker to place the parking voucher in a location of the vehicle so that the voucher may be scannable by the mobile enforcement vehicle's vision system.

At step 930, upon issuance of the voucher, the relevant information pertaining to the parking request, including the time of issuance and parking expiration time may be associated by the central processor to the parking voucher ID number and recorded in the database. At this point the central processor may not have knowledge of which issued voucher is being used with which parking stall.

While on patrol, the mobile enforcement vehicle may scan the parking stalls to determine the stall numbers and transmit this information along with the time of scan (i.e. time of observation) to the central processor. In some embodiments, the mobile enforcement vehicle may scan both empty and occupied stalls. The mobile enforcement vehicle may indicate to central processor whether or not the transmitted stall number corresponds to an empty or an occupied stall using an appropriate indicator. In some embodiments, the mobile enforcement vehicle may transmit parking stall information as they are scanned, in real-time. In other embodiments, the scans may be made first and transmitted later in batches and subsequently analyzed in the parking office.

During the patrol, the mobile enforcement vehicle may also record and transmit to the central processor vehicle-identifying information (e.g. color, make and model, and license plate number) corresponding to the vehicle occupying a given stall, the stall number, the time of observation and the ID number of the voucher. In some instances, the mobile enforcement vehicle may not be able to scan the identification number during its patrol. In that case, a notification to a PEO may be sent to direct the PEO to the parking stall in question so that a manual scan may be performed. If the manual scan successfully identifies the voucher ID number, then the voucher ID number along with the parking stall number and vehicle-identifying information may be transmitted to the central processor. Otherwise, the failed manual scan may indicate that the parker did not purchase a parking voucher, which may justify issuance of a citation.

At step 940, the central processor may receive the stall number, vehicle-identifying information, and voucher identification number for a given stall. An association or a link between the voucher ID number and parking stall number may be established if the identified voucher ID number has not been previously associated with a parking stall. In some embodiments, association of a new voucher ID number to a stall may terminate the parking voucher previously associated with that parking stall. As a result, the previous voucher may not be used further. Therefore, detection of a terminated voucher ID number may trigger an infraction alert if the voucher ID number was detected in association with a parked vehicle. At step 950 the central processor analyzes the received information corresponding to the identified stall to determine whether there is a parking violation.

FIG. 9B depicts a process flow diagram showing further details of step 950 of FIG. 9A in which a parking violation may be detected at a given parking stall. At decision step 954, the central processor may determine whether or not, at the time of observation, the permitted parking time at the identified parking stall has expired. To do so, the central processor may query the database using the parking voucher identification number to obtain the expiration time assigned to the parking voucher. If the parking time has expired, then the parking stall should not be occupied (i.e. answering "No" at decision step 954) and the method proceeds to steps 970 and 972, in a manner similar to the method described in FIG. 6B, in which a citation should be issued for occupying an unpaid or expired parking stall. If the parking stall is paid for (i.e. answering "Yes" at decision step 954), the central processor may proceed to decision step 956 to determine, for the given stall, whether the voucher ID number identified from the most recent patrol is different from the voucher ID number identified from the immediately preceding patrol. If there is a difference (i.e. answering "Yes" at decision step 956), then it may be concluded that a new parker has paid for parking and the vehicle currently occupying the stall is validly parked so that the method may proceed to step 975 and end.

On the other hand, if the voucher ID number assessed at step 956 is the same, then the method may proceed to step 958 to perform a comparison of the vehicle-identifying information obtained during the most recent patrol and the immediately preceding patrol. If the comparison reveals that the vehicle-identifying information is the same (i.e. answering "No" at decision step 958), then it may be concluded that the vehicle occupying the parking stall has not changed during the two patrols and the vehicle is validly parked so that the method may proceed to step 975 and end. If the comparison reveals that the vehicle-identifying information is different (i.e. answering "Yes" at decision step 958), then it may be concluded that a new parker has occupied the parking stall using a previously purchased parking voucher. In other words, a voucher pass-back event may be detected. The method may then proceed to 970 and 972 in a manner similar to the method described in FIG. 6B in which a citation should be issued for occupying an unpaid or expired parking stall.

Issuance of Citations

As discussed previously, the mobile enforcement vehicle may scan and collect parking stall information at a much higher speed than manual parking enforcement. The level of efficiency, however, may be significantly reduced if the patrol vehicle must stop each time it encounters a parking violation to issue a citation. In some embodiments, the technique of micro-processing may be used to issue citations in a more efficient manner. The stall numbers corresponding to occupied parking stalls for which citations are to be issued may be transmitted to another PEO who may then go directly to the citable vehicle to issue and serve the citations. The PEO receiving the transmission may be a PEO who patrols on foot. Once the citation has been issued, the central processor may be notified by the PEO which may in turn notify the mobile enforcement vehicle that generated the citation alert that the cited vehicle(s) have been processed.

For some cases, the GPS system may use micro-segments. Generally the GPS system must start and travel from a good GPS location and finish at a good GPS location. A good location is defined as to where the GPS has excellent satellite reception. Generally, in post processing methodology, the GPS data is analyzed at the end of the day (or next day), corrections applied using the INS (inertial navigation system) data, infractions determined and citations mailed. It is also possible to analyze data every few minutes and send citations to follow up PEOs that would track down and serve the citations on the windows of the infracting vehicles.

To ensure an error-free assignment of citations, there may be a need to have a human officer to review all potential citations and in particular oversee "ambiguous cases" (i.e. cases where it is unclear as to whether a citation is required) to confirm that issuance of a citation is needed. In some situations, whether a parking violation has occurred may be unclear. For instance, as a result of uncertainties with respect to determining the position of a parked vehicle, it may be difficult to "place" the vehicle to a parking stall. A human officer may be needed to manually examine images acquired during the patrol for the parking stall to make an assessment.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. The scope of the claims should not be limited by the preferred embodiments and examples, but should be given the broadest interpretation consistent with the description as a whole.

The invention claimed is:

1. A method of managing a parking lot using a patrol vehicle, the parking lot comprising a plurality of parking stalls for occupancy by a plurality of vehicles, each parking stall having a unique parking stall identifier, at least one parking stall being occupied by a corresponding parked vehicle, the patrol vehicle having a memory and a processor, the method comprising:
   storing, in the memory, a predetermined boundary for each of the plurality of parking stalls;
   determining, by the processor, if an approximate longitudinal and transverse center of the parked vehicle is located within a predetermined boundary of the corresponding at least one parking stall, and if so:
      flagging, by the processor, the at least one parking stall as an occupied parking stall;
      determining, by the processor, at a first time, a parking duration rule for the occupied parking stall, the parking duration rule indicating a parking expiration time for the parked vehicle at the corresponding occupied parking stall; and
      determining, by the processor, if the first time exceeds the parking expiration time, and if so, generating a citation alert for the occupied parking stall.

2. The method of claim 1, wherein the parking duration rule is based on a parking authorization request received from an operator of the parked vehicle occupying the occupied parking stall.

3. The method of claim 2, wherein when the first time does not exceed the parking expiration time, the method further comprising:
   determining, at the first time, a detected vehicle identifier corresponding to at least one detected characteristic of the parked vehicle at the occupied parking stall;
   determining if the parked vehicle corresponds to the vehicle associated with the parking authorization request, wherein the parking authorization request comprises a vehicle identifier identifying at least one characteristic of the vehicle;
   if the parked vehicle does not correspond to the vehicle associated with the parking authorization request, determining if a second parking authorization request is received for the occupied parking stall; and
   if the second parking authorization request is determined to not have been received for the occupied parking stall, generating a citation alert for the parked vehicle.

4. The method of claim 3, wherein determining the detected vehicle identifier comprises:
   detecting a license plate number of the parked vehicle using an image processing system on the patrol vehicle.

5. The method of claim 1, wherein determining if the approximate longitudinal and transverse center of the parked vehicle is situated within the predetermined boundary of the at least one parking stall comprises:
   generating a laterally extending polygon based on a direction of travel of the patrol vehicle, the laterally extending polygon encapsulating a geometric center of the at least one parking stall; and
   determining if global positioning coordinates of the approximate longitudinal and transverse center of the parked vehicle is located within the laterally extending polygon.

6. The method of claim 1, wherein determining the approximate longitudinal and transverse center of the parked vehicle comprises:
   determining at least one of a length of the parked vehicle and a width of the parked vehicle, such that if the parked vehicle is positioned parallel to a direction of travel of the patrol vehicle, the length of the parked vehicle is determined, and if the parked vehicle is positioned perpendicular to the direction of travel of the patrol vehicle, the width of the parked vehicle is determined;
   determining a position of the patrol vehicle;
   determining a distance between the patrol vehicle and the parked vehicle; and
   determining the approximate longitudinal and transverse center of the parked vehicle based on the at least one of the length and the width of the parked vehicle, the position of the patrol vehicle, and the distance between the patrol vehicle and the parked vehicle.

7. The method of claim 6, wherein the at least one of the length and the width of the parked vehicle is determined based on laser scanning of at least one corresponding edge of the parked vehicle, the laser scanning being carried out by a laser system provided on the patrol vehicle.

8. The method of claim 6, wherein the at least one of the length and the width of the parked vehicle is determined based on image processing carried out by an image processing system provided on the patrol vehicle.

9. The method of claim 6, wherein the position of the patrol vehicle is determined based on global positioning system (GPS) coordinates of the patrol vehicle.

10. The method of claim 1, wherein the predetermined boundary for each parking stall is stored based on global positioning coordinates of at least one corner of the respective parking stall.

11. A parking lot management system for managing a parking lot, the parking lot comprising a plurality of parking stalls for occupancy by a plurality of vehicles, each parking stall having a unique parking stall identifier, at least one parking stall being occupied by a corresponding parked vehicle, the system comprising:
   a non-transient computer memory; and
   a processor coupled to the non-transient computer memory, the processor and the non-transient computer memory being provided on a patrol vehicle, the processor being configured to:
      store, in the memory, a predetermined boundary for each of the plurality of parking stalls;

determine, by the processor, if an approximate longitudinal and transverse center of the parked vehicle is located within a predetermined boundary of the corresponding at least one parking stall;

if the parked vehicle is determined to be within the corresponding predetermined boundary of the at least one parking stall, flag, by the processor, the at least one parking stall as an occupied parking stall;

subsequently, determine, by the processor, at a first time, a parking duration rule for the occupied parking stall, the parking duration rule indicating a parking expiration time for the parked vehicle at the corresponding occupied parking stall; and determine, by the processor, if the first time exceeds the parking expiration time, and if so, generate a citation alert for the occupied parking stall.

12. The system of claim 11, wherein the parking duration rule is based on a parking authorization request received from an operator of the parked vehicle occupying the occupied parking stall.

13. The system of claim 12, wherein the processor is configured to:

generate a laterally extending polygon based on a direction of travel of the patrol vehicle, the laterally extending polygon encapsulating a geometric center of the at least one parking stall; and determine if global positioning coordinates of the approximate longitudinal and transverse center of the parked vehicle is within the laterally extending polygon.

14. The system of claim 12, wherein the processor is configured to:

determine at least one of a length of the parked vehicle and a width of the parked vehicle, such that if the parked vehicle is positioned parallel to a direction of travel of the patrol vehicle, the length of the parked vehicle is determined, and if the parked vehicle is positioned perpendicular to the direction of travel of the patrol vehicle, the width of the parked vehicle is determined;

determine a position of the patrol vehicle;

determine a distance between the patrol vehicle and the parked vehicle; and determine the approximate longitudinal and transverse center of the parked vehicle based on the at least one of the length and the width of the parked vehicle.

15. The system of claim 14, wherein the system further comprises a laser system provided on the patrol vehicle and coupled to the memory and the processor, and wherein the at least one of the length and the width of the parked vehicle is determined based on laser scanning of at least one corresponding edge of the parked vehicle.

16. The system of claim 12, wherein when the first time does not exceed the parking expiration time, the processor is further configured to:

determine, at the first time, a detected vehicle identifier corresponding to at least one detected characteristic of the parked vehicle at the occupied parking stall;

determine if the parked vehicle corresponds to the vehicle associated with the parking authorization request, wherein the parking authorization request comprises a vehicle identifier identifying at least one characteristic of the vehicle;

if the parked vehicle does not correspond to the vehicle associated with the parking authorization request, determine if a second parking authorization request is received for the occupied parking stall; and if the second parking authorization request is determined to not have been received for the occupied parking stall, generate a citation alert and issuing a parking citation to the parked vehicle.

17. A non-transitory computer-readable medium storing computer-executable instructions, the instructions for causing a processor, coupled to a memory, to perform a method of managing a parking area, the parking lot comprising a plurality of parking stalls for occupancy by a plurality of vehicles, each parking stall having a unique parking stall identifier, at least one parking stall being occupied by a corresponding parked vehicle, where the computer-readable medium is provided on a patrol vehicle, the method comprising:

storing, in the memory, a predetermined boundary for each of the plurality of parking stalls;

determining, by the processor, if an approximate longitudinal and transverse center of the parked vehicle is located within a predetermined boundary of the corresponding at least one parking stall, and if so:

flagging, by the processor, the at least one parking stall as an occupied parking stall;

determining, by the processor, at a first time, a parking duration rule for the occupied parking stall, the parking duration rule indicating a parking expiration time for the parked vehicle at the corresponding occupied parking stall; and determining, by the processor, if the first time exceeds the parking expiration time, and if so, generating a citation alert for the occupied parking stall.

18. The non-transitory computer-readable medium of claim 17, wherein the parking duration rule is based on a parking authorization request received from an operator of the parked vehicle occupying the occupied parking stall.

19. The non-transitory computer-readable medium of claim 17, wherein determining the approximate longitudinal and transverse center of the parked vehicle comprises:

determining at least one of a length of the parked vehicle and a width of the parked vehicle, such that if the parked vehicle is positioned parallel to a direction of travel of the patrol vehicle, the length of the parked vehicle is determined, and if the parked vehicle is positioned perpendicular to the direction of travel of the patrol vehicle, the width of the parked vehicle is determined;

determining a position of the patrol vehicle;

determining a distance between the patrol vehicle and the parked vehicle; and determining the approximate longitudinal and transverse center of the parked vehicle based on the at least one of the length and the width of the parked vehicle, the position of the patrol vehicle, and the distance between the patrol vehicle and the parked vehicle.

20. The non-transitory computer-readable medium of claim 17, wherein when the first time does not exceed the parking expiration time, the method further comprising:

determining, at the first time, a detected vehicle identifier corresponding to at least one detected characteristic of the parked vehicle at the occupied parking stall;

determining if the parked vehicle corresponds to the vehicle associated with the parking authorization request, wherein the parking authorization request comprises a vehicle identifier identifying at least one characteristic of the vehicle;

if the parked vehicle does not correspond to the vehicle associated with the parking authorization request, determining if a second parking authorization request is received for the occupied parking stall; and if the second parking authorization request is determined to not have been received for the occupied parking stall, generating a citation alert and issuing a parking citation to the parked vehicle.

\* \* \* \* \*